US011301683B2

(12) United States Patent
Goel et al.

(10) Patent No.: US 11,301,683 B2
(45) Date of Patent: Apr. 12, 2022

(54) ARCHITECTURE, ENGINEERING AND CONSTRUCTION (AEC) CONSTRUCTION SAFETY RISK ANALYSIS SYSTEM AND METHOD FOR INTERACTIVE VISUALIZATION AND CAPTURE

(71) Applicant: Autodesk, Inc., San Rafael, CA (US)

(72) Inventors: Shubham Goel, San Francisco, CA (US); Charis Kaskiris, Berkeley, CA (US); Patricia Keaney, Greenbrae, CA (US); Anand Rajagopal, San Francisco, CA (US); Maryam Rezvani, Walnut Creek, CA (US); Manu Venugopal, San Francisco, CA (US); Xin Xu, Cambridge, MA (US); Brad Lee Bitler, San Francisco, CA (US)

(73) Assignee: AUTODESK, INC., San Rafael, CA (US)

( * ) Notice: Subject to any disclaimer, the term of this patent is extended or adjusted under 35 U.S.C. 154(b) by 90 days.

(21) Appl. No.: 16/598,366

(22) Filed: Oct. 10, 2019

(65) Prior Publication Data

US 2020/0117903 A1 Apr. 16, 2020

Related U.S. Application Data

(60) Provisional application No. 62/743,949, filed on Oct. 10, 2018.

(51) Int. Cl.
*G06K 9/00* (2006.01)
*G06K 9/62* (2006.01)
*G05B 9/02* (2006.01)

(52) U.S. Cl.
CPC ..... *G06K 9/00684* (2013.01); *G06K 9/00671* (2013.01); *G06K 9/00771* (2013.01); *G06K 9/6267* (2013.01); *G05B 9/02* (2013.01)

(58) Field of Classification Search
CPC ............... G06F 30/00; G06K 9/00671; G06K 9/00684; G06K 9/00771; G06K 9/6267; G06T 7/0004; G06T 2200/24; G06T 2207/20092; G06T 19/00; G06T 2215/16; G05B 9/02
See application file for complete search history.

(56) References Cited

U.S. PATENT DOCUMENTS

| 2012/0065944 A1* | 3/2012 | Nielsen | G06Q 10/103 703/1 |
| 2019/0050942 A1* | 2/2019 | Dalal | G06Q 50/163 |
| 2020/0074383 A1* | 3/2020 | Smith | H04W 4/023 |

\* cited by examiner

*Primary Examiner* — Kenny A Cese
(74) *Attorney, Agent, or Firm* — Gates & Cooper LLP

(57) ABSTRACT

A computer-implemented method and system provide the ability to determine and provide a safety risk analysis for construction. Construction related data is obtained and includes textual data and a visual artifact for the construction project. A construction safety context is identified based on the construction related data. Based on the construction safety context, a safety participant risk score that assigns a numerical safety risk participant value to any entity involved in the construction project is determined. Based on the safety risk participant score, a safety project score that assigns a risk level on a per-project basis is determined. The safety risk analysis is presented based on the safety participant risk score and safety project score, via a graphical user interface.

26 Claims, 18 Drawing Sheets

ARCHITECTURE, ENGINEERING AND CONSTRUCTION (AEC) CONSTRUCTION SAFETY RISK ANALYSIS SYSTEM AND METHOD FOR INTERACTIVE VISUALIZATION AND CAPTURE

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/743,949, filed on Oct. 10, 2018, with inventor(s) Shubham Goel, Charis Kaskiris, Patricia Keaney, Anand Rajagopal, Maryam Rezvani, Manu Venugopal, and Xin Xu, entitled "ARCHITECTURE, ENGINEERING AND CONSTRUCTION (AEC) CONSTRUCTION SAFETY RISK ANALYSIS SYSTEM AND METHOD FOR INTERACTIVE VISUALIZATION AND CAPTURE".

This application is related to the following co-pending and commonly-assigned patent application, which application is incorporated by reference herein:

U.S. patent application Ser. No. 15/996,230, filed on Jun. 1, 2018, which issued Nov. 24, 2020 as U.S. Pat. No. 10,846,640 with inventor(s) Shubham Goel, Charis Kaskiris, Patricia Keaney, Anand Rajagopal, and Manu Venugopal, entitled "ARCHITECTURE, ENGINEERING AND CONSTRUCTION (AEC) RISK ANALYSIS SYSTEM AND METHOD", which application claims the benefit of 62/513,923 filed on Jun. 1, 2017.

BACKGROUND OF THE INVENTION

1. Field of the Invention

The present invention relates generally to construction safety, and in particular, to a method, apparatus, system, and article of manufacture for determining capturing, and interactively visualizing a safety risk in construction.

2. Description of the Related Art

Safety is a top priority for every general contractor—they want to send the workers home safely. However, despite this priority, the construction industry accounts for one (1) out of five (5) total workplace deaths in the United States. The U.S. Bureau of Labor Statistics reported in 2007 that there were 26,000 construction fatalities in the last decade in the United States and five (5) construction worker deaths every working day. Safety incidents have a direct impact on contractor's insurance rates, bonding capacity, and profits/losses. Accordingly, it is desirable to build a "safety culture" that attempts to improve safety and health management in the construction industry. One such technique of safety culture is that of rewarding positive behavior. For example, instead of assigning blame in a high-potential incident (i.e., a near-miss that could have resulted in serious injury), construction companies may thank the people onsite who put together an incident report and turn the incident into a lesson that can be shared both internally within the company and externally. Other techniques may exist as well. In view of the above, it is desirable to identify, evaluate, and present safety risks before an injury/death occurs. Prior art techniques fail to not only recognize such a problem/task, but also fail to determine and present the safety risks in a cohesive timely manner.

SUMMARY OF THE INVENTION

Embodiments of the invention provide safety risk scores that assign a numerical safety risk value (and derivative classifications) to any entity (e.g., subcontractor, business partner, etc.) involved in a particular construction project, and then a project safety score that provides a risk level on a per-project basis. Such scores are then presented via various graphical user interfaces to enable participants to take action and improve safety with respect to the construction project. Further, embodiments of the invention combine multiple sources of safety information and incorporate safety language topic models (e.g., including the use of machine learning/artificial intelligence based models) to enable the improved capture and understanding of safety behavior.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
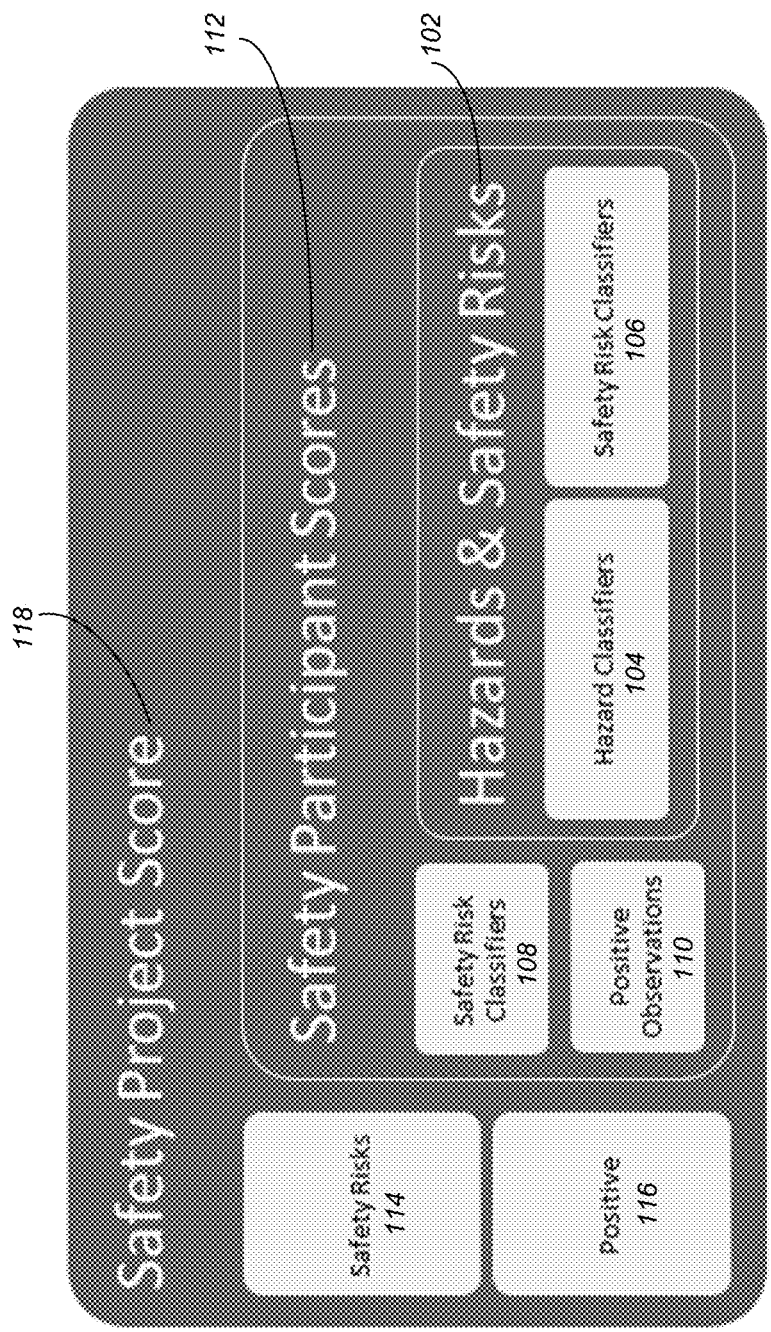
FIG. 1 illustrates the various safety scores computed and presented in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

There are four primary risk factors on a construction project—quality, schedule, cost, and safety. Embodiments of the invention focus on the safety risk factor. In 2015, 937 fatalities were reported. The reported data shows the top four ways fatalities occur on job sites: 364 falls (40%), 90 struck by object (10%), 81 electrocution (9%), and 67 caught in between (7%). Eliminating the "fatal four" would save 602 worker lives every year. It is estimated that only a portion of incidents are typically reported. For example, for every 1 fatality, 30 lost workday cases, and 300 recordable injuries that are reported, there are estimated by be 3000 near misses and 300,000 estimated at-risk behaviors that are never reported or analyzed. Embodiments of the invention attempt to automatically categorize behavior and patterns by these high risk areas, and by surfacing the risk every day such that when a high risk happens, incidents can be avoided before they occur.

Embodiments of the invention leverage technology (e.g., mobile devices, Internet of things (IOT), drones, cameras, wearables, and sensors that capture data in the field that is aggregated in the cloud) to automatically categorize behavior and patterns by high safety risk areas, and surface the safety risk every day in order to help avoid incidents before they occur.

In exemplary embodiments, field management for safety may include providing documents in the field, managing inspections with checklists, track non-conforming items through issues, and provide reports (e.g., all via a cellphone, tablet, or other dashboard type user interface). In one or more embodiments, safety risks and trends can be identified on a project every day and surfaced/exposed to project teams before incidents happen so they know which subcontractors have poor safety practices (so they can be addressed as soon as possible). In addition, patterns may be observed by project. For example, some projects may show higher safety risk behaviors around fall risks compared to others. By identifying/observing these patterns early, safety managers can tune their safety tool talks and training to the problems playing out on their jobsite. In view of the above, embodiments of the invention utilize various construction data sources (e.g., design models and drawings, images, construction documents, point clouds, schedules, voice, issues and checklists, sensors/IOT) to identify hazards, fatal four risk predictions, subcontractor safety risks, project safety risks, and historical analysis.

In an exemplary use case, every morning, a superintendent can check project risk (just like they check the weather), and understand which subcontractors are at risk and take action. From thousands of issues, a superintendent may see thirty (30) high risk issues and five (5) water risks on a given day. Further, a dashboard/user interface may be utilized by construction executives to see how all of their projects are performing over time including a risk across projects and subcontractors. For example, a heat map may be used to display various different safety models to provide a unique view of project risk.

Further to the above, embodiments of the invention may utilize machine learning and artificial intelligence to progressively increase the accuracy of predicting and preventing safety incidents. For example, embodiments of the invention may enable taking a picture of an issue, applying image recognition and classification, predicting the corrective action, and automatically assigning the corrective action to the right person. In alternative embodiments, automated safety inspections may be provided such that drones may be programmed to perform scaffolding inspections (which are required every day). Image recognition and classification models may then be used to automatically complete a 20-point checklist and flag safety issues that need to be corrected before the scaffolding can be used.

In view of the above, embodiments of the invention provide an architecture, engineering, and construction (AEC) safety risk analysis system and method for interactive visualization and capture. Various components/sub-components may be utilized as part of the system. In one or more embodiments the components include an AEC safety risk behavioral scoring system safety hazard identification, and safety risk prediction method and apparatus (that may also include machine learning development). Additional components/sub-components may include a method and apparatus for extracting safety behavior risks, construction safety context (and similarity), and hazards from text descriptions. Additional/alternative components/sub-components may extract such safety behavior risks, construction safety context (and similarity), and hazards from images. Such extraction via image recognition may further include image processing in front-end applications. Analysis of textual descriptions of observations may also be utilized to detect/determine whether remarks are positive or negative. Further, components/sub-components may be utilized to conduct a subcontractor safety risk assessment and identification, as well as a project safety risk assessment and determination. Once the risks have been analyzed/determined, embodiments of the invention provide the ability to present the safety behavior risks and safety hazards to users (e.g., via a dashboard/user interface). Such a user interface may further include the ability to utilize and present auto-text summarization of the risks. Each of these above areas will be described in independent sections that follow.

AEC Safety Risk Behavioral Scoring System, Safety Hazard Identification, and Safety Risk Prediction Method and Apparatus Embodiments of the invention enable the determination of Safety Risk Scores that assign a numerical safety risk value (and derivative classifications) to any entity (e.g. subcontractor, business partner) involved in a particular project and then a Project Safety Score that provides a risk level on a per-project basis. Combining multiple sources of safety information and incorporating safety language topic models allows for the better capture and understanding of safety behavior.

Features utilized in these scoring systems are derived by tracking safety observations that are structured, unstructured (e.g. text descriptions, text observations), and visual artifacts (e.g. images). These scores are in effect tracking the behavioral patterns of individuals, teams, business partners, projects and ultimately safety cultures of construction enterprises. FIG. 1 illustrates the various safety scores computed and presented in accordance with one or more embodiments of the invention. Hazards and Safety Risks 102 are computed based on various hazard classifiers 104 and safety risk classifiers 106. Based on the hazards and safety risks 102, as well as safety risk classifiers 108 and positive observations 110, safety participant scores 112 may be computed (i.e., the safety risk of particular entities/participants of/in a project). Based on the safety participant scores 112 as well as safety risks 114 and positive information 116, a safety project score 118 may be computed (i.e., the safety risk for a project).

Construction safety is a critical component of any construction project as it involves the occupational health of employees working in environments that may be deemed hazardous. Preventing safety incidents and promoting a culture of elevated safety and hazard awareness can contribute to better-run projects with less incidents at a lower cost (including insurance costs and bonding levels). Safety is a combination of risky behavior (in terms of safety), existence of hazards, and potentially unexpected events. The AEC Safety Risk Analysis System (of embodiments of the invention) is a novel data-driven model-powered implementation in software of safety risk metrics for the AEC industry. The data it ingests may be coming from existing safety issue/incident tracking systems or enabled by artificial intelligence (AI) on data capture applications for on-the-fly assessments and classification.

The components of embodiments of the invention include machine learning models and corresponding software embodiments that support some/all of the following functionality:

1. Method and Apparatus of Extracting Safety Behavior Risks and Safety Hazards from Text Descriptions
   a. Housekeeping Identification from a textual sources module;
   b. Safety Risk Identification from a textual sources module;
   c. Safety Hazard Identification from a textual sources module;
2. Safety Hazard Identification from an image sources module;
3. Positive Observations from a textual sources module;
4. Subcontractor Safety flag module;
5. Project Safety Risk Module; and
6. Contextual Awareness of Safety Risk Behaviors using images.

Broad Areas of Machine Learning Development

There is a set of machine learning methods embodied in this system that try to better quantify safety-related behavior as well as provide ways to assess safety culture. To that extent, embedded classifiers (e.g., classifiers 104-106) may be created that can classify observations into positive and negative; classify observations into precursors to fatality related risk categories (e.g. fatal four—falls, struck by, caught in between, electrocution); the assessment on how job site management can create unsafe conditions (e.g. by identifying safety hazards—improper personal protection, improper equipment utilization), etc.

The system and method provided for tracking safety observations either in an ad-hoc manner or through the use of a codified safety program as captured through the use of checklists. Checklists provide a way for a safety program to be implemented in a repeatable manner. Checklist performance and conformance metrics over applicable timeframes are used to assess the health of the safety program.

Sources of Data

Figure 2:
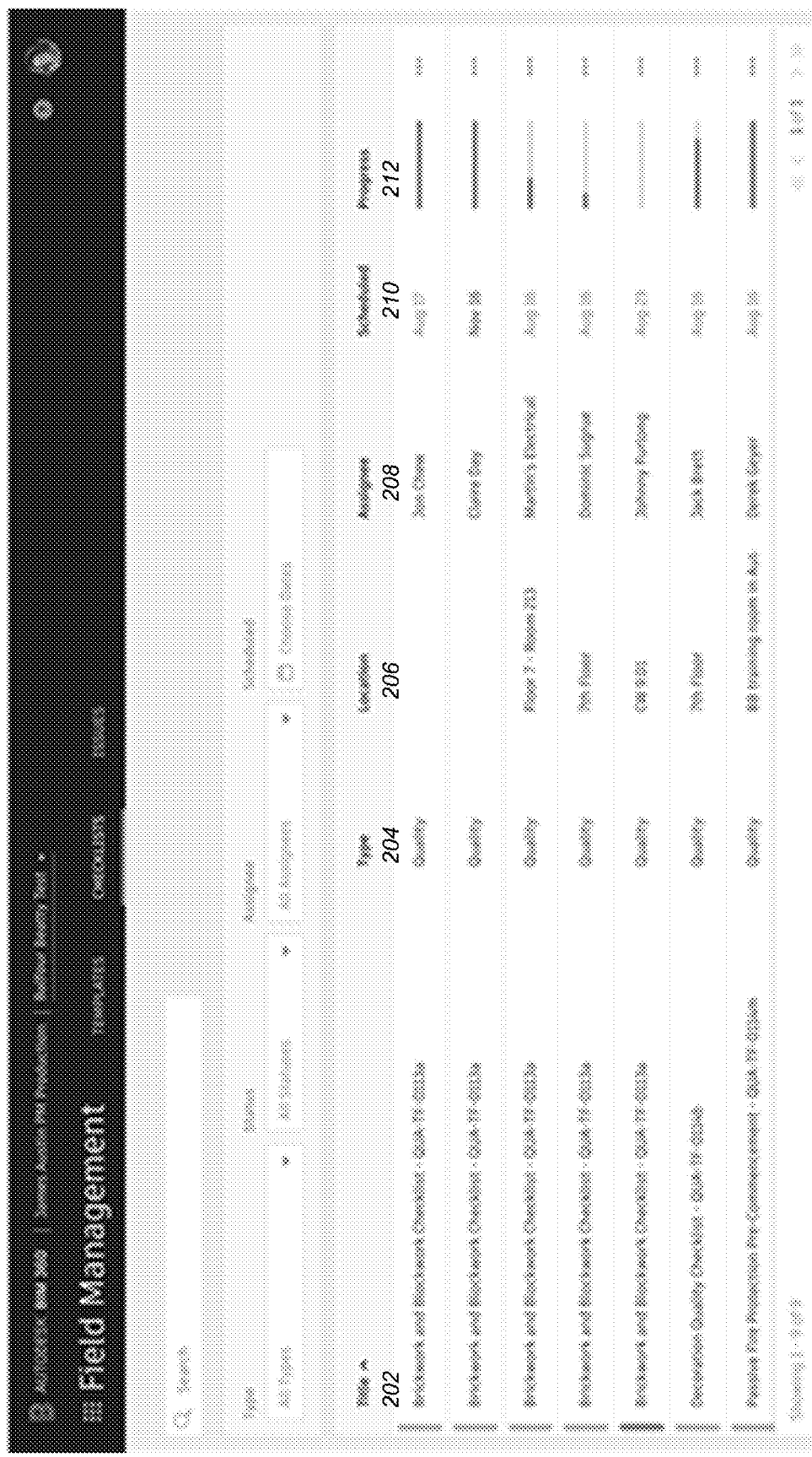
FIG. 2 illustrates a field safety issue captured user interface provided in accordance with one or more embodiments of the invention.

The data utilized in accordance with one or more embodiments of the invention can be ingested from different types of sources. These sources may be existing BIM (building information model) issue tracking systems, smartphone/tablet apps, sensor-captured data, cameras, drones, etc. Some of the ways that data is organized to be used (as part of Field Management) is shown in FIG. 2. In this regard, FIG. 2 illustrates a field safety issue captured user interface provided in accordance with one or more embodiments of the invention. As illustrated, a field management user interface may be used to view, select, and perform other operations relating to checklists including checklist titles 202, types of checklists 204 (e.g., quality), the location 206 within the BIM model for the checklist, the assignee 208 of the checklist, the date 210 the checklist is scheduled for completion, and a progress indicator 212 reflecting completion status of the checklist.

Figure 3:
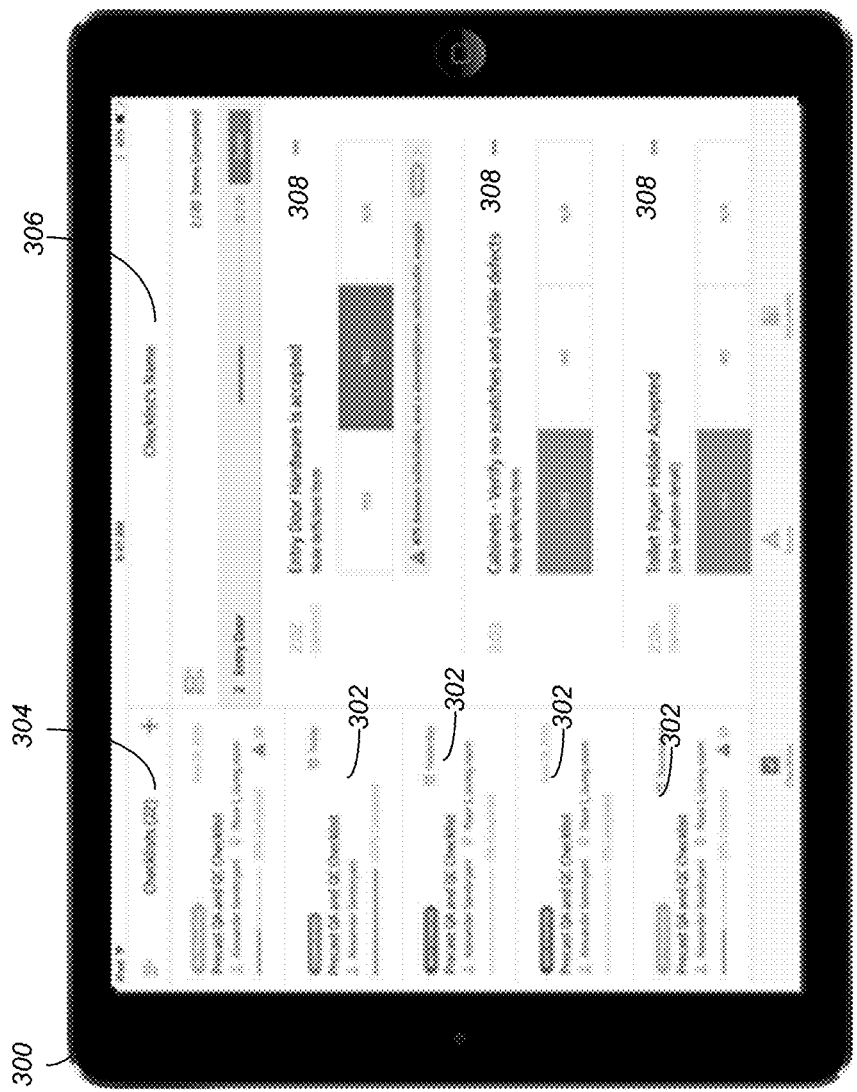
FIG. 3 illustrates a tablet based checklist capture in accordance with one or more embodiments of the invention.

Checklist functionality may also be utilized in tablet devices and/or smartphones. FIG. 3 illustrates a tablet based checklist capture in accordance with one or more embodiments of the invention. A list of checklists 302 available for selection are displayed in checklist menu 304. Once selected, the checklist 302 is displayed in area 306 with the individual items 308 on the checklist 302. User selections via the touchscreen of tablet 300 may be used to determine whether an item 308 has been performed (e.g., via selection of a "Yes" icon) or is waiting to be performed (e.g., via a visual indication/highlighting of the "No" icon).

Figure 4:
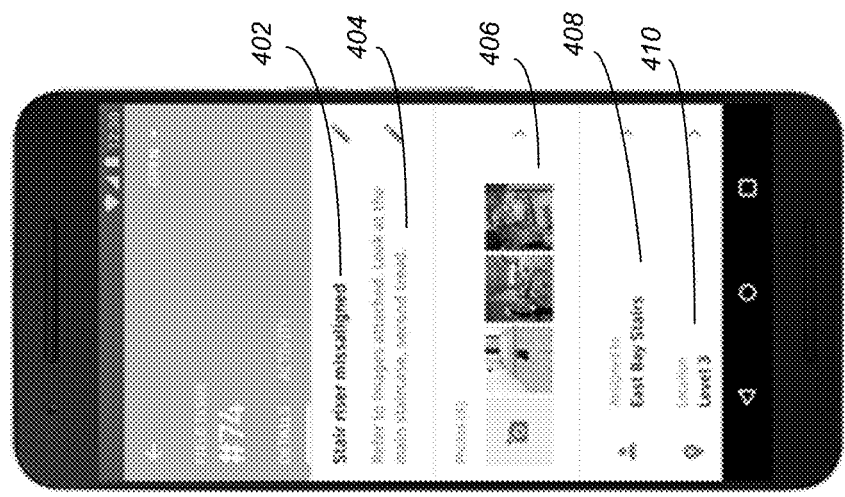
FIG. 4 illustrates a smartphone issue data capture in accordance with one or more embodiments of the invention.

FIG. 4 illustrates a smartphone issue data capture in accordance with one or more embodiments of the invention. In this regard, an app on the smartphone enables the user to capture and record information about any construction issues that may arise. For example, in FIG. 4, field issue #74 includes information/text 402 identifying the issue—that the stair riser is misaligned. More detailed issue information 404 may also be displayed—e.g., "Refer to images attached. Look at the main staircase, second tread." The smartphone issue data app may also include the ability to select images/photos 406. By selecting the pen icon adjacent to the various fields 402-404, the information in that field 402-404 may be edited/revised. Further, additional photos may be added by selecting the camera icon adjacent to photos 406. Further, the smartphone app may also enable the user to view who has been assigned to the particular field issue (e.g., in area 408). Alternatively, field 408 may identify which issues the smartphone's user has been assigned to. The app may also identify the location 410 of the issue. Accordingly, the smartphone issue data capture app/user interface enables a user to view, edit, update, add, and identify construction issues.

Input Data

Observations utilized to identify safety hazards can be in the form of the following data types:
1. Textual descriptions based on user-input (e.g., via field 402-404 in the smartphone issue app);
2. Photos of observations/material pertaining to safety observations (e.g., via photos 406);

3. Forms (e.g. OSHA 300) that track incidents, mandated descriptions of incidents, mandated descriptions of fatalities;

4. Auto-generated issues tracked by checklists (e.g., checklist 306), automated devices, sensors; and 5. Meta-data (e.g. user-generated categorizations, etc.).

Method and Apparatus of Extracting Safety Behavior Risks and Safety

While the above section provides for identifying safety hazards, predicting safety risks, and providing a risk behavioral scoring system, this section describes additional details regarding the extraction/determining of safety behavioral risks based on a variety of factors. Below is a description of the evaluation of text descriptions to extract safety behavior risks from textual descriptions and from images.

Construction Safety Context and Similarity from Text Descriptions

Construction language understanding is a major building block in extracting meaning and context within textual resources generated in construction. A method for extracting safety hazards, safety behaviors, and safety risks is set forth in one or more embodiments of the invention. The building blocks of one or more embodiments perform the following tasks:

1. Identify the construction safety topic of an arbitrary set of text;

2. Identify the construction safety context on the basis of the text; and

3. Identify the similarity between different blobs of text in the context of construction safety and assess the construction-context level similarity between two text blobs.

Embodiments of the invention provide trained models to produce word embeddings (e.g. such as WORD2VEC, DOC2VEC) using a large-scale corpus of construction related documents, for example but not limited to: specifications, contracts, cost control material, requests for information, change management, submittals, OSHA safety reports, etc. For example, such models take as input the large corpus of construction related documents and produce a vector space as output, with each unique word in the corpus being assigned a corresponding vector in the space. The word vectors are positioned in the vector space such that words that share common contexts in the corpus may be located close to one another in the space. Specifically, autoencoders may be used against the corpus to generate neural word embeddings that are further refined by fine tuning the layers to create dynamic word to vector embeddings. The vector embeddings allow for upstream machine language recognition that is used to compare two different blobs of text for similarity of context (construction-wise, safety-wise). Such a comparison enables upstream measurement of hazard frequency and recency that is further incorporated into construction safety risk models.

In one or more embodiments, the novel embeddings are built off the largest known construction text corpus.

Hazards from Text Descriptions

Not all construction safety observations/issues are created equal. Embodiments of the invention provide a way to identify safety hazards as well as identifying whether certain indicators in the issue descriptions point to potential safety risks closely associated with the fatal four categories. Broader categories of safety related classes of issues are described below:

Set of Output Labels Generated by the Text Classifiers

Once safety issues are captured in the system, the associated hazards are automatically identified. Such hazards are further classified by the text classifiers. Such classifying may identify an issue as a housekeeping issue, a safety risk issue, and/or a hazard issue.

Issue Category: Housekeeping

Housekeeping issues have been identified to be a potential indicator of subcontractors who need training, but also that bad housekeeping may also generate potential safety hazards (e.g. trip hazards, electrocution hazards, etc.). The text mining (of embodiments of the invention) may utilize a set of rules and prediction models driven by machine learning that identifies if a particular text (and its meta-data) are indicators of a context relating to housekeeping. If the context is detected beyond a set of thresholds, the text is deemed to be either a housekeeping problem or not.

The recency and frequency (within different level time-windows) of housekeeping behavior are tracked and provided to the end users. They are also presented at different levels of aggregation; from company, business unit, project, subcontractor levels of aggregation.

Issue Category: Safety Risks.

The following issues/text may be classified/associated with a safety risk.

1. Fall
2. Electrocution
3. Caught-in-between
4. Struck-by
5. Fire

The text mining algorithm uses a combination of rules and prediction models to infer if the context described in a piece of text (and related meta-data) involve a potential safety risk within different classes. In this particular case, issues with the above text have been classified as safety risks (but are not limited to the above text/labels). Embodiments of the invention may also utilize derived features based on text and models trained on expert labels.

Issue Category: Hazards

The following issues/text may be labeled/associated with hazards.

Scaffold
Fall Arrest System
Barricade
Lift and Hoist
Hand Rail
Guard Rail
Leading Edge
Openings and Holes
Elevated Surface
Electrical
Fire Protection
PPE
PPE—Face and Eye
PPE—Head
PPE—Respiratory
Ladder
Falling Object Protection
Excavation
Sharp Edges
Material
Access and Egress
Confined Space
PPE—Foot
PPE—Gloves
PPE—Proper Clothing
Trip Hazard
Fork Lifts and Trucks
Crane
Hand/Power Tools Welding/Cutting
Lighting
Housekeeping
Work Environment
Machinery
Equipment/Installation
PPE—Hearing The text mining algorithms use a combination of rules and prediction models to infer if the context described in a piece of text (and related meta-data) involve a potential safety risk within different classes. The above identified issues are classified as safety hazards (but such classified issues are not limited to the above issues/labels). Embodiments of the invention may utilize derived features based on text and models trained on expert labels. Each hazard category has its own separate set of blended models to infer what the specified hazard is. Thresholds delineating likelihood of hazard categories are provided and a scoring function derives the most likely hazard labels.

Method and Apparatus of Extracting Safety Behavior Risks and Safety from Images

In construction images are one of the most extensively used ways of tracking construction job sites. They provide evidence of different aspects of construction including work completion, quality defects, safety behavior, job progress, labor resourcing, and equipment for commissioning.

The images can also come from different sources such as field issue tracking software instantiated on smartphones and tablets, intelligent cameras, drones, security cameras, and so forth. When images are originated in field issue tracking software, they typically are in the context of documenting which may also provide associated text to describe the issue while a photo may also provide context.

Embodiments of the invention utilize artificial intelligence models to identify objects and activity in photos and extract the context (or topic), identify objects/humans, and provide guidance on what the photo is referring to that has significance in construction terms.

Hazards from Images

The same uniform characterization of hazards as described in the textual form can also be detected/extracted from images. This allows models that assess safety risk to be able to corroborate and reinforce hazard identification when both image and textual references exist; which is typically the preponderance of the cases.

Figure 5:
FIG. 5 illustrates an example of an object identification visual in accordance with one or more embodiments of the invention.

FIG. 5 illustrates an example of an object identification visual in accordance with one or more embodiments of the invention. As illustrated, four objects 502 have been identified. Via image processing, the four objects 502 have been identified as fuel containers with the likelihood/percentage that the object 502 has been accurately identified is noted in the text. Deep neural networks (e.g., convolutional neural networks [also known as nets]) may be utilized to identify specific construction related hazards based on expert labels. Different nets may be used to detect different types of hazards and builds utilizing expertly labeled images.

In one or more embodiments, state of the art object detection algorithms like Single Shot Detection (SSD) may be trained using transfer learning techniques to gain high accuracy. Data augmentation techniques are used to generalize the model for larger, unseen data.

Detection of Positive Remarks in Safety Text Associated with Textual Descriptions of Observations Embodiments of the invention utilize textual descriptions of safety observations to assess if the sentiment provided in the safety issue description text is one of a positive or a negative manner.

Feature generation algorithms from statistical text mining and natural language processing may be utilized to extract textual features which are then modeled using machine learning classifiers to predict whether the content and context of the description is reflecting a positive or negative sentiment. The output of the prediction is in general a category (with a representation of the algorithm's level of certainty of the correctness of the classification). As each component is identified as a positive versus a negative sentiment, these can be further time-sliced and aggregated to develop trending models.

The technologies used in such embodiments may include typical text mining components/encoders (parsers, taggers, POS (part of speech)). Characteristics may be developed from combinations of extracted features and assessed using feature engineering approaches.

Method and Apparatus for Subcontractor Safety Risk Assessment and Identification Referring to FIG. 1, risk assessment models (that can be used to determine safety participant scores 112) are models that feed off the results of the classifier models (positive observations 110, hazard identification 104, and safety risk identification 106-108) to generate features based on time-slicing, category-slicing frequency and recency.

Model Components

There is a set of features generated based on subcontractor activity with regards to safety:

1. Hazards 104
2. Safety Risks 108
3. Positive Safety Observations 110

For the negative side of the features, embodiments of the invention utilize a scheme that ranks the hazards and risks into levels of severity and uses specific multipliers to deal with the trends of these features.

Scoring functions utilize feature sets in the recency band with feature sets that track trending behavior weighted by multipliers that allow for calibrations of the resulting safety scores 112. The safety scores 112 are then translated by a monotonic function into generating a safety-flag or not.

The scoring function may also utilize the long-term effect of past behavior weighted at a discount so as to provide a balance between repeat safety misbehavior and current behavior as embedded in the feature sets.

Embodiments of the invention may further include a large set of features (that may be weighted at zero (0) or a higher value).

Method and Apparatus for Project Safety Risk Assessment and Determination

Each project may also experience a level of safety risk behavior that represents the level of safety risks associated with it as a whole. As used herein, such a level of safety risk behavior may be associated with a safety project score 118. The level of safety risk behavior may also reflect the effects of the safety behavior of the subcontractors on the particular project (i.e., the safety project score 118 is dependent upon the safety participant scores 112). In general, a plurality of accumulation of safety events can determine if a project is exhibiting safety behavior that is potentially of elevated risk and needs addressing. In this regard, a minimum threshold may be established for the safety project score 118 in order to conclude in a determination that there is an elevated safety risk that needs addressing.

Counterfactual Tests

Data quality metric evaluation may be conducted to provide insight on whether a project is following its implementation of safety program as instantiated in safety checklist activity. If the frequency, recency, and volume of activity is below typical/expected thresholds then a project may be flagged as 'low activity' which supersedes project risk assessment flags/scores.

Characteristics Utilized in Project Safety Flag (Slim)

A project safety risk assessment module utilizes information about activity of individual subcontractor entities on a project. The definition of safety activity includes:

1. Negative Safety Issues captured in an ad-hoc manner;
2. Positive Safety Issues captured in an ad-hoc manner; and
3. Negative Safety Issues captured from pre-specified safety plans (e.g. checklists).

Figure 6:
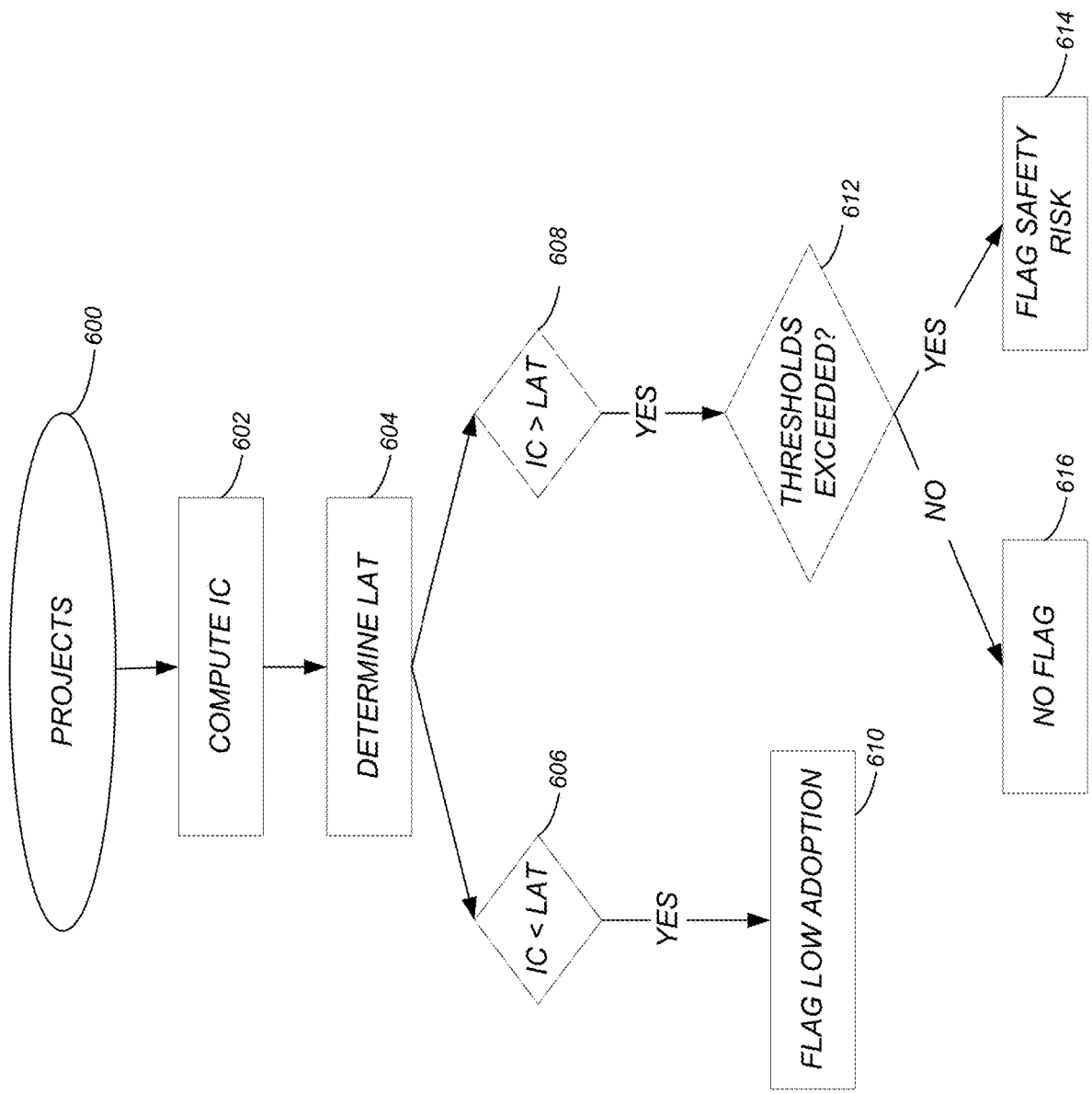
FIG. 6 illustrates the logical flow for a project safety risk assessment in accordance with one or more embodiments of the invention.

FIG. 6 illustrates the logical flow for a project safety risk assessment in accordance with one or more embodiments of the invention. For each project 600, a safety risk assessment may be conducted. At step 602, the IC (Issue+Checklists) is calculated/computed/determined. The IC is the # of issues+ the number of checklists run. At step 604, the Low Adoption Threshold (LAT) value is determined/computed/calculated. The LAT is a minimum threshold value representing the frequency, recency, and volume of a typical/expected activity.

At steps 606 and 608 the IC is compared to the LAT. If the IC is below the LAT (i.e., step 606), then a flag is set indicating that a project 600 has low activity/adoption and there is no need to evaluate safety risks (i.e., the safety risk is slim).

However, if the IC>LAT (i.e., the frequency/recency, and volume of issues and checklists exceeds a typical/expected level) (i.e., step 608), another determination is conducted as 612 to determine if certain thresholds have been exceeded. In this regard, if the [# of fatal four] safety risks exceeds a fatal four value threshold, OR the [# of subcontractors@risk] exceed a safety risk for subcontractors, a safety flag risk is set at step 614. However, if neither of the thresholds have been exceeded at step 612 (i.e., the fatal four threshold or the subcontractor@risk threshold), then no flag is set at step 616.

In view of the above, the purpose of a project safety risk assessment module is to provide an indicator of the safety risk for a project 600. As illustrated in FIG. 6, the indicator may in the form of a flag. However, the indicator may also be presented as part of an absolute scale or a transformation through a monotonic function.

Method and Apparatus for Utilization of Image Processing at Front-End Applications Models developed for extracting meaning and categorizing what is observed in photos are instantiated in front-end applications (e.g. smartphones) to provide a simpler user experience in capturing data as well as providing higher quality data into the data platform at the point of generation of the data.

Front-End Smartphone/Tablet Workflow Logic

Figure 7:
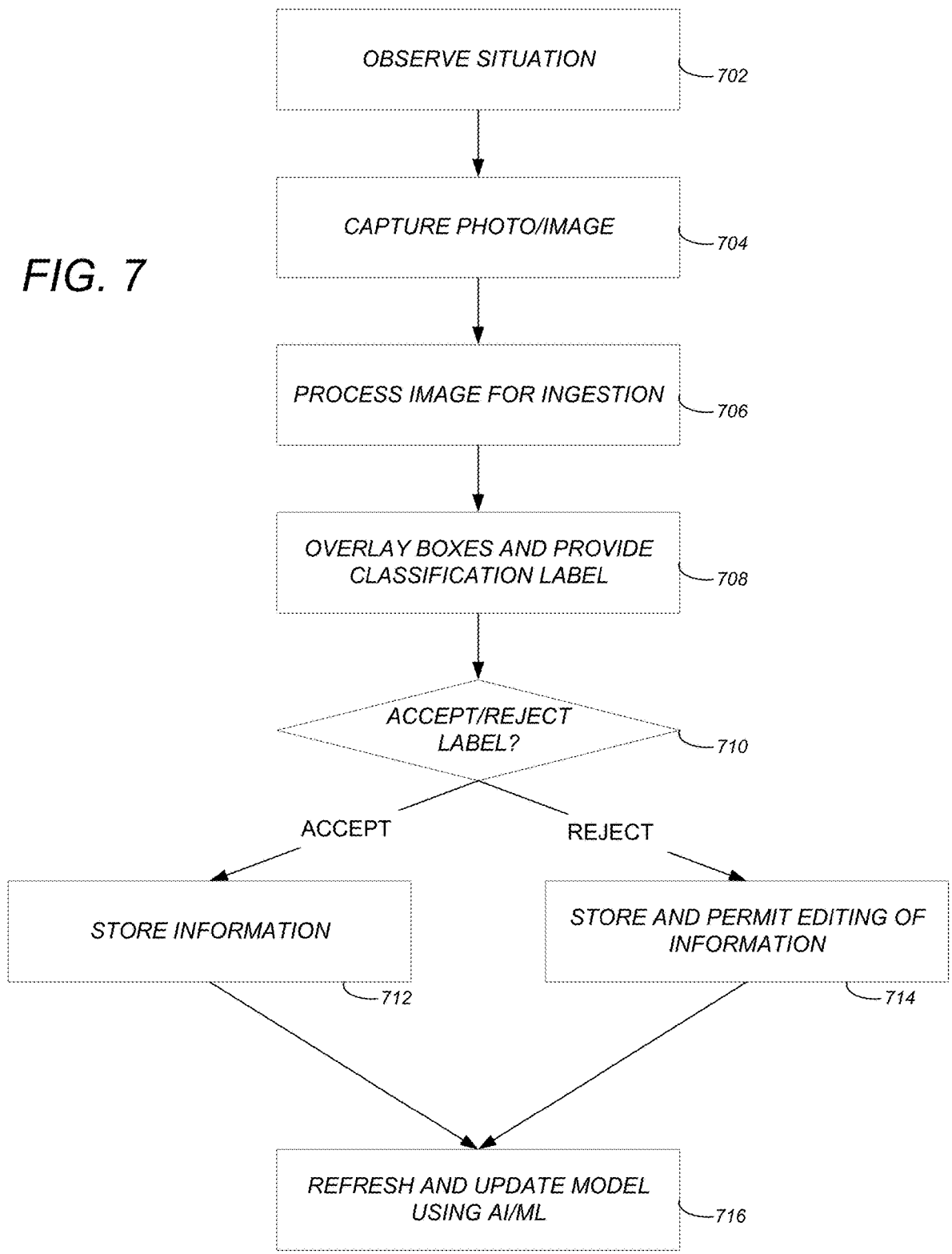
FIG. 7 illustrates the workflow logic for extracting meaning and categorizing observations in the field via a front-end application (e.g., on a smartphone or tablet) in accordance with one or more embodiments of the invention.

FIG. 7 illustrates the workflow logic for extracting meaning and categorizing observations in the field via a front-end application (e.g., on a smartphone or tablet) in accordance with one or more embodiments of the invention.

At step 702, a user observes a particular situation that warrants documentation. The documentation is to be captured in an issue/observation tracking system.

At step 704, the user points and uses a front-end application (e.g., a smartphone) to capture an image (e.g., take a photo).

At step 706, once the image/photo is loaded it is processed to so that it can be ingested by the image processing module.

At step 708, the image processing module ingests the image/photo and generates a set of bounding boxes overlaid on the photo that delineate the boundaries of the detected subject/object that triggered a classification. The image processing module ingestion also provides the classification label for the particular subject/object.

At step 810, a determination is made regarding whether the user has accepted/rejected the classification label (i.e., the user is given the option).

If accepted, at step 712, the system stores the image/photo, bounding boxes coordinates, labels and user actions as well as a performance metric. Such a performance metric may be based on a true/false positive as determined by the system.

If not accepted, at step 714, the system still stores the related information (as in step 712) but may also permit editing of the information. For example, the system may provide a way for the user to reposition the bounding box, provide a user-defined label, optionally create new bounding boxes and labels on the image itself, and/or submit the new data (for storage).

At step 716, models used to determine/identify a safety issue/hazard may be periodically refreshed as more data is collected and the margin of error starts exceeding a pre-determined level (e.g., a machine learning model/algorithm may be used to more accurately identify safety risks/hazards).

Visual Workflow

FIGS. 8-12 illustrate an exemplary sequence of photos that demonstrate the workflow of automatic categorization at the point of image capture (e.g., step 708).

Figure 8:
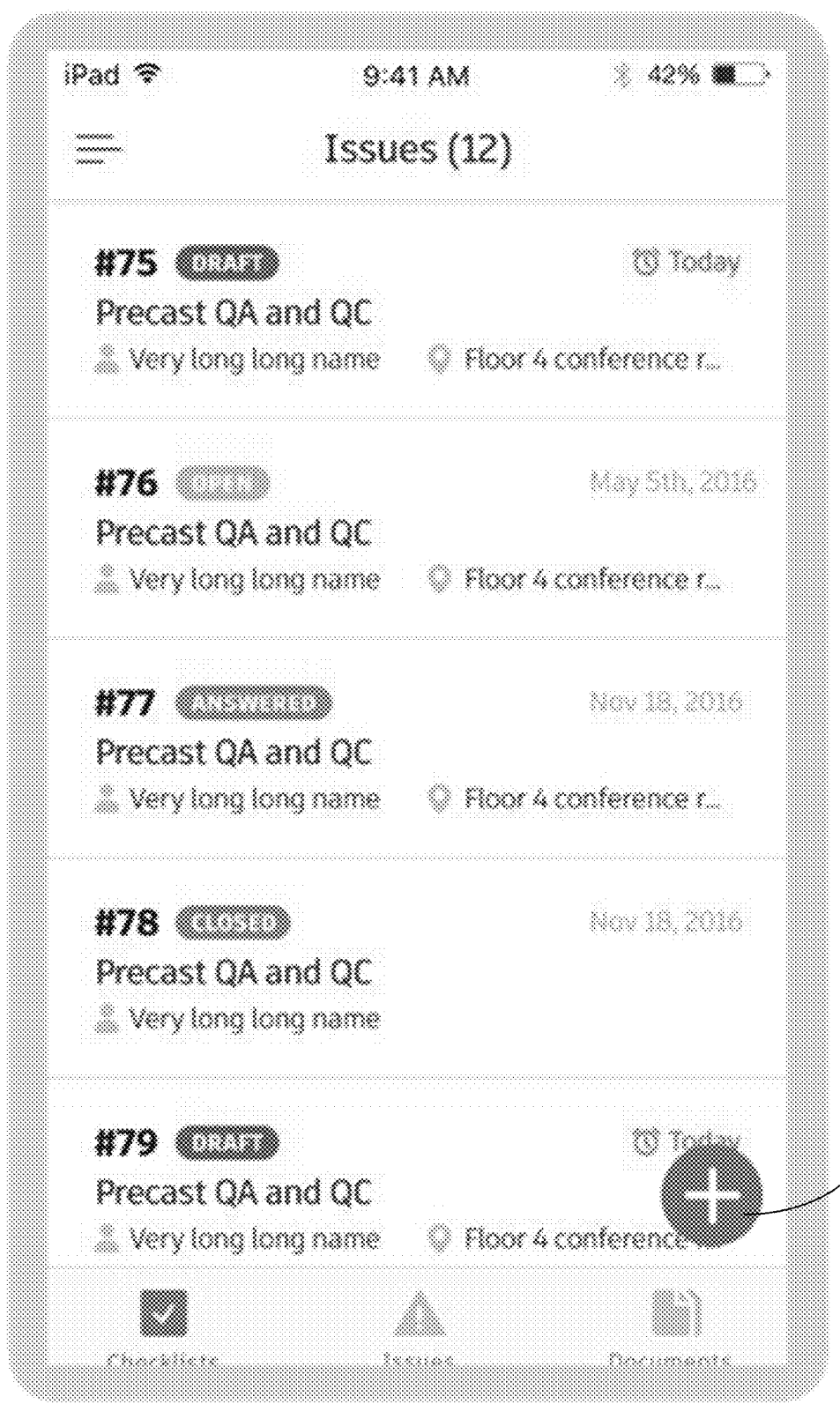
FIG. 8, an issue user interface is presented that displays the currently stored/available list of identified issues in accordance with one or more embodiments of the invention.

In FIG. 8, an issue user interface is presented that displays the currently stored/available list of identified issues. The user has the option of selecting the "+" icon 802 to add a new issue.

Figure 9:
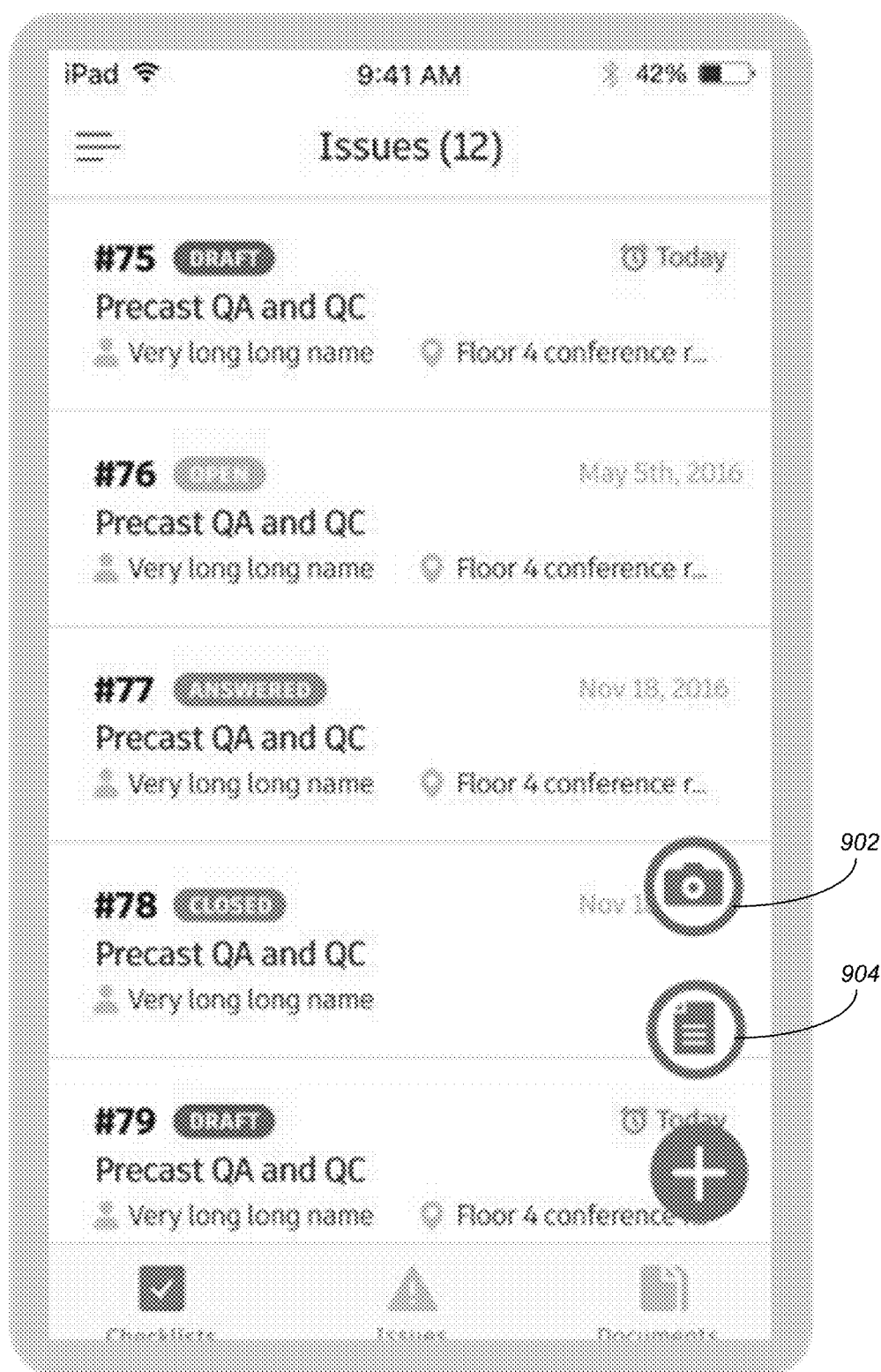
FIG. 9 illustrates the user interface that is displayed once the user has elected to add an issue in the user interface of FIG. 8 in accordance with one or more embodiments of the invention.

FIG. 9 illustrates the user interface that is displayed once the user has elected to add an issue in the user interface of FIG. 8. Once the "+" icon has been selected, the user may be presented with the ability to add a photograph (by selecting icon 902) or a document/text (by selecting icon 904).

Figure 10:
FIG. 10 illustrates the user interface for capturing a photo once the photograph icon has been selected in FIG. 9 in accordance with one or more embodiments of the invention.

FIG. 10 illustrates the user interface for capturing a photo once the photograph icon 902 has been selected in FIG. 9. The current scene captured by the camera/smartphone's lens is displayed in area 1002, and the user may take/capture the photo by selecting icon 1004, use a different camera lens (e.g., switching to the front-facing camera) by selecting icon 1006, and/or preview previously taken pictures by selecting icon 1008.

Figure 11:
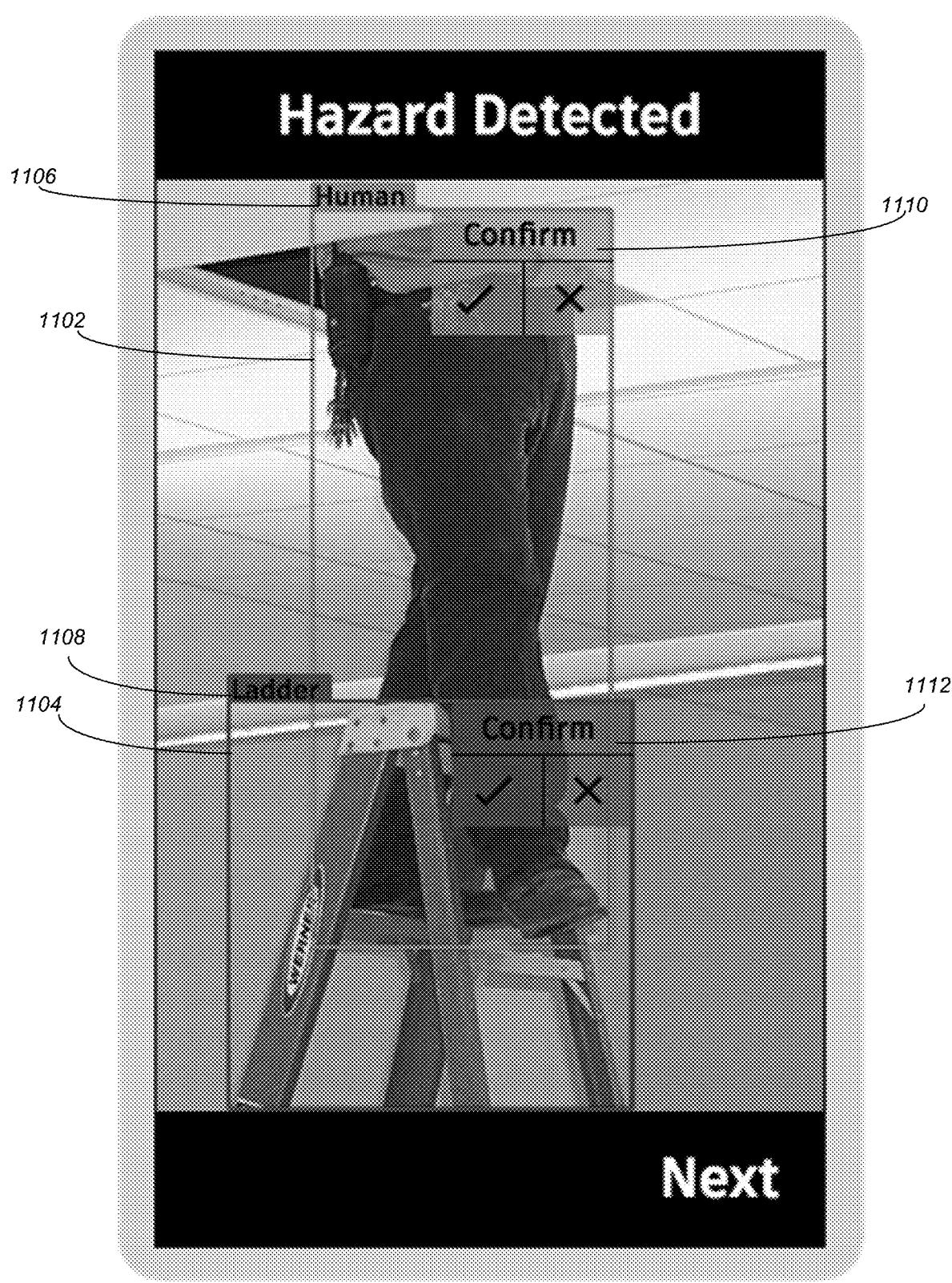
FIG. 11 illustrates the image ingestion/processing and user query step subsequent to capturing the image via the user interface of FIG. 10 in accordance with one or more embodiments of the invention.

FIG. 11 illustrates the image ingestion/processing step 708 and user query step 710 subsequent to capturing the image via the user interface of FIG. 10 in accordance with one or more embodiments of the invention. In FIG. 11, two objects have been identified via overlaid boxes 1102 and 1104 and an attempt to identify the objects has been conducted via image recognition resulting in text labels 1106 and 1108. As illustrated, box 1102 has been identified as containing a human (via text label 1106), and box 1104 has been identified as containing a ladder (via text label 1108). Further, it is not just objects that have been identified but objects associated with a hazard. FIG. 11 also provides the opportunity for the user to confirm or reject the identified objects 1102-1104 as hazards via checkboxes 1110 and 112.

Figure 12:
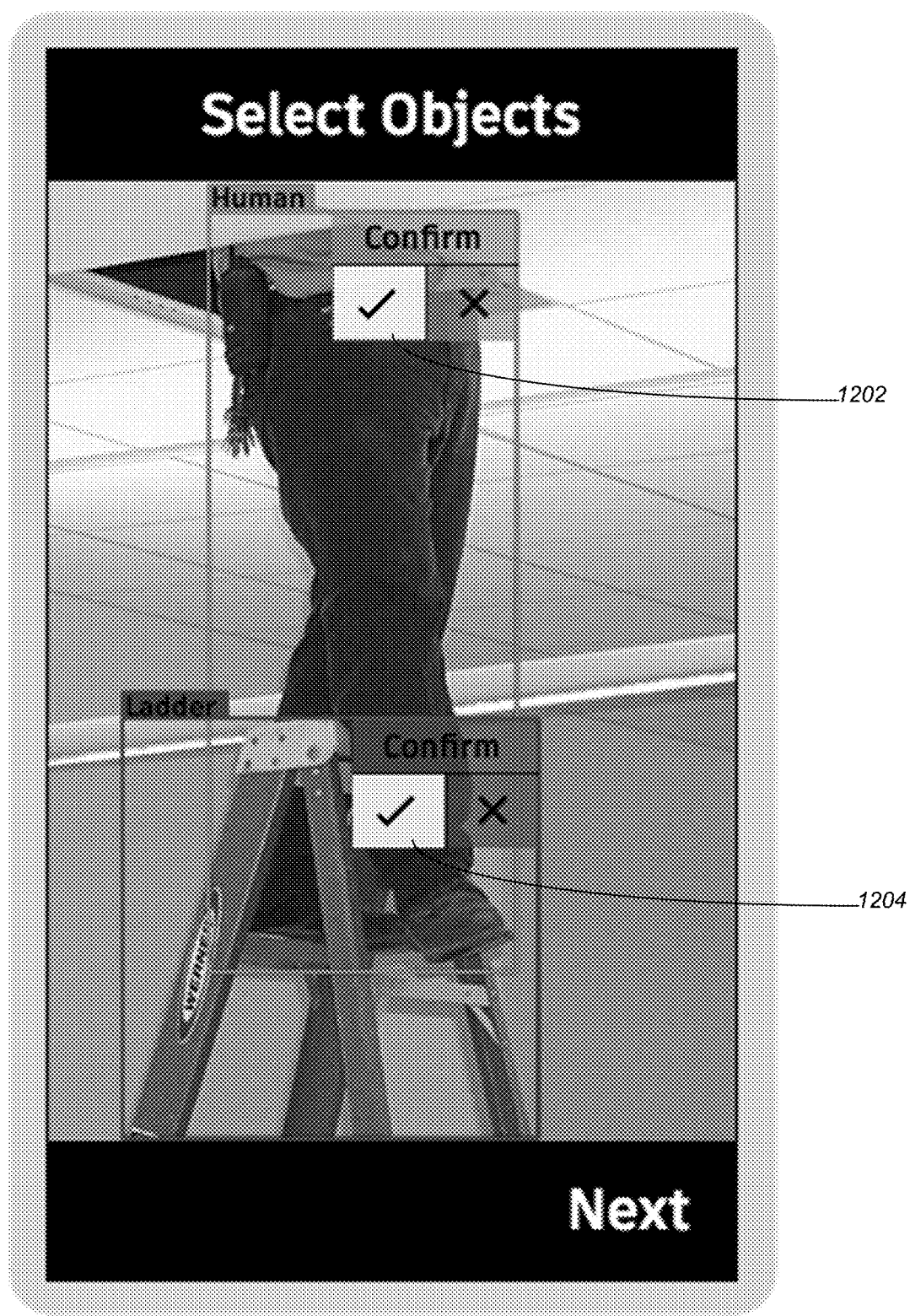
FIG. 12 illustrates that the user has elected to confirm/accept/select the identified objects in accordance with one or more embodiments of the invention.

FIG. 12 illustrates that the user has elected to confirm/accept/select the identified objects (reflected by the highlighted checkboxes 1202 and 1204).

In view of the above, FIGS. 7-12 illustrate the user interface presented during the process of identifying and confirming safety hazards/issues in the field in accordance with one or more embodiments of the invention.

FIGS. 7-12 further illustrate the utilization of auto-text summarization at front-end applications. The basic premise is that a method and module of embodiments of the invention provide a way for an easier user-experience in capturing safety and quality-related issues utilizing images as the input and artificial intelligence components (modules) for guided predictive data capture.

The extracted object labels and their quantity can be used to search the data on the cloud platform. The occurrence frequency of the data, the semantic proximity to the detected objects 1102-1104, and relevance to the key performance indicators can be used to prioritize the results and make text suggestions (e.g., text labels 1106-1108) from the existing corpus.

Embodiments of the invention may also provide cascading prediction modules that deal with the prediction of different aspects of issue tracking. For example, an image-based hazard recognition module and/or a text-based hazard recognition module may provide issue prediction indications based on the modules described above. In other embodiments, a predicted context module may predict issues based on indications generated by the image and/or text based modules coupled with schedule, location, plan, crew, task a prediction of context and what is happening is generated based on a prediction model's safety-context.

Further to the above, a prediction module may predict descriptions, assignees, and categories.

A predicted description refers to a component that makes use of the predicted context against a knowledge-base of descriptions of similar issues and provides a recommended set of text that has been provided before in a similar context (determined by matching metrics). Different options may be provided ordered by their relative level of likelihood. If they are both incorrect the user may choose to generate his/her own description. In addition, decisions to access/reject predictions may be tracked and knowledge-base retrained based on false-positive rates.

With respect to the predicted assignee, based on the predicted context (based on schedule, area, plan, material, equipment), the potential set of assignees is determined and sorted by the likelihood of being responsible. The top candidate is proposed, the proposed list is available, and the complete list is made available by user action (e.g. click to receive the whole list of assignees). The potential set of assignees may also be generated based on RFID matching against a data store of RFIDs to users/contractors.

Predicted categories are either based on the image safety risk/hazard/object detection module (described earlier) or a text-based safety risk/hazard module (described earlier).

Interaction Workflow

Figure 13:
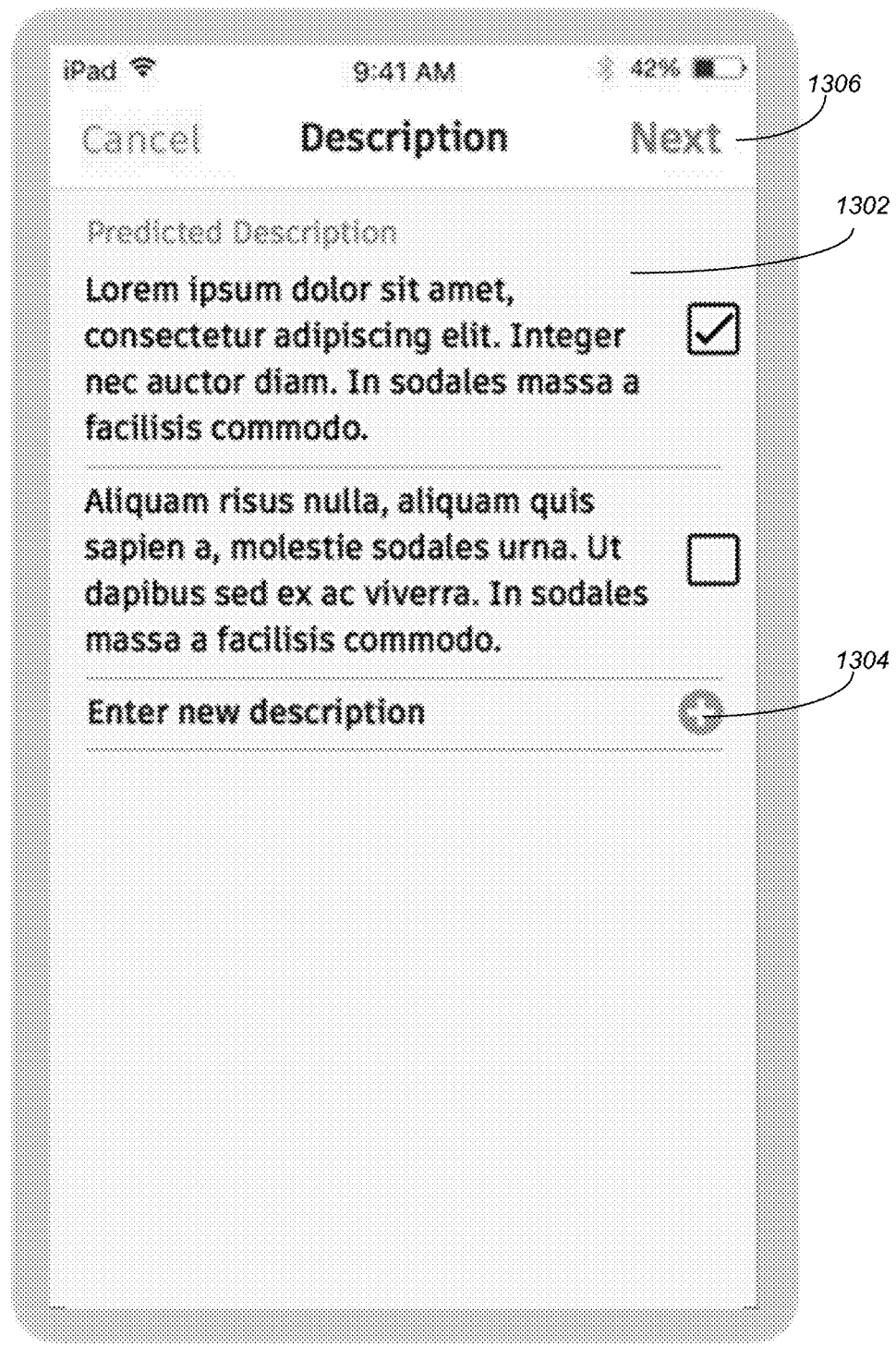
FIG. 13 illustrates a description user interface in accordance with one or more embodiments of the invention.

Once the context is identified from the image-based safety context identification, auto-text summarization may be triggered that generates text describing the issue from the corresponding matching in the knowledge-base. The top options are presented and an option to insert their own text is provided. FIG. 13 illustrates a description user interface in accordance with one or more embodiments of the invention. The description user interface provides a predicted description 1302 and the option to enter a new description 1304

Figure 14:
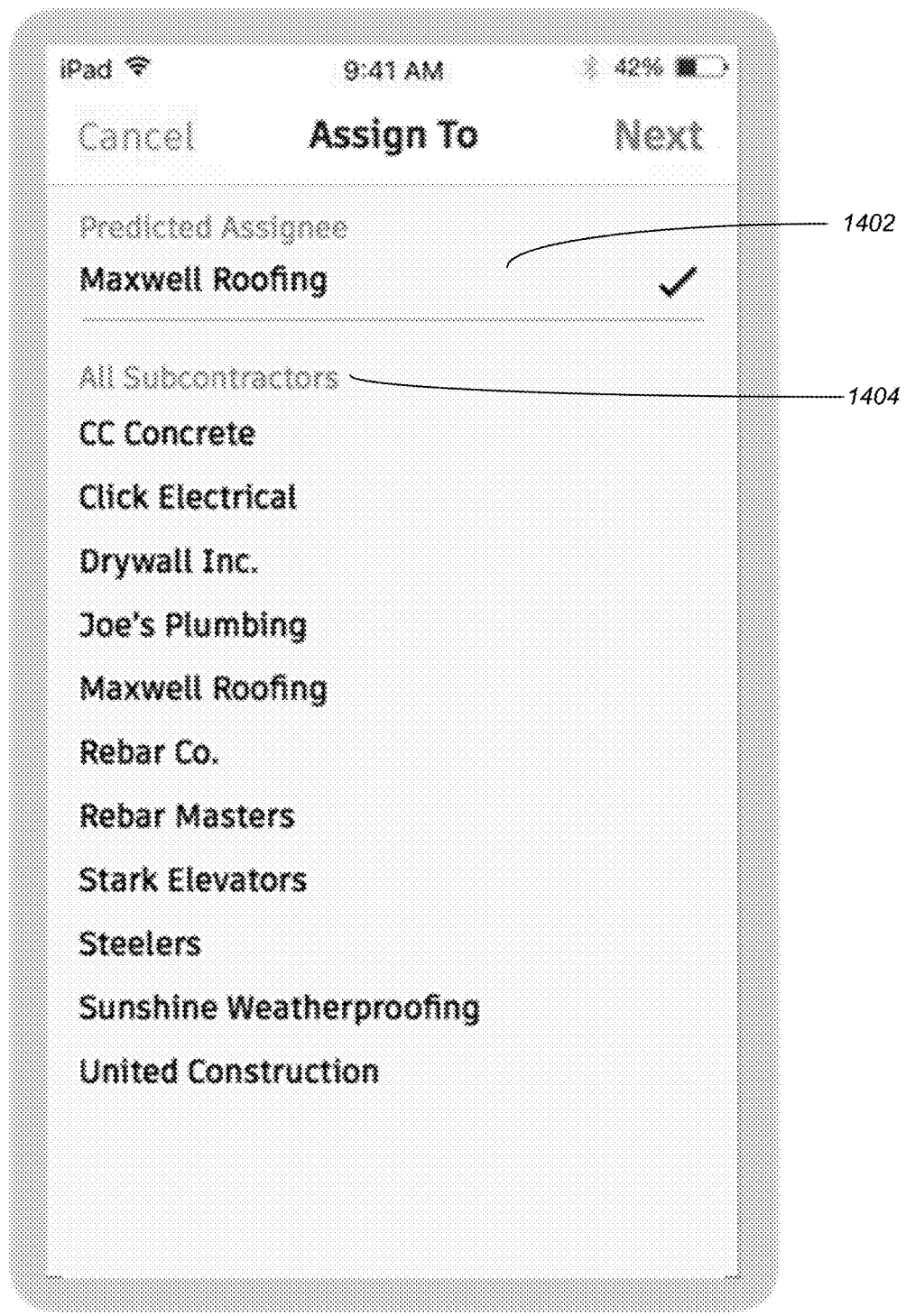
FIG. 14 illustrates an issue assignment graphical user interface in accordance with one or more embodiments of the invention.

Once the user has accepted a description (e.g., by clicking the "next" hyperlink 1306), the user is provided with an issue assignment graphical user interface as illustrated in FIG. 14. The top proposed assignees 1402 for the issue (again based on context and prior experience) are displayed. The user can accept (by selecting the "Next" hyperlink/button) or find another assignee based on the subcontractors assigned to the project (a list 1404 expands are per user request).

Figure 15:
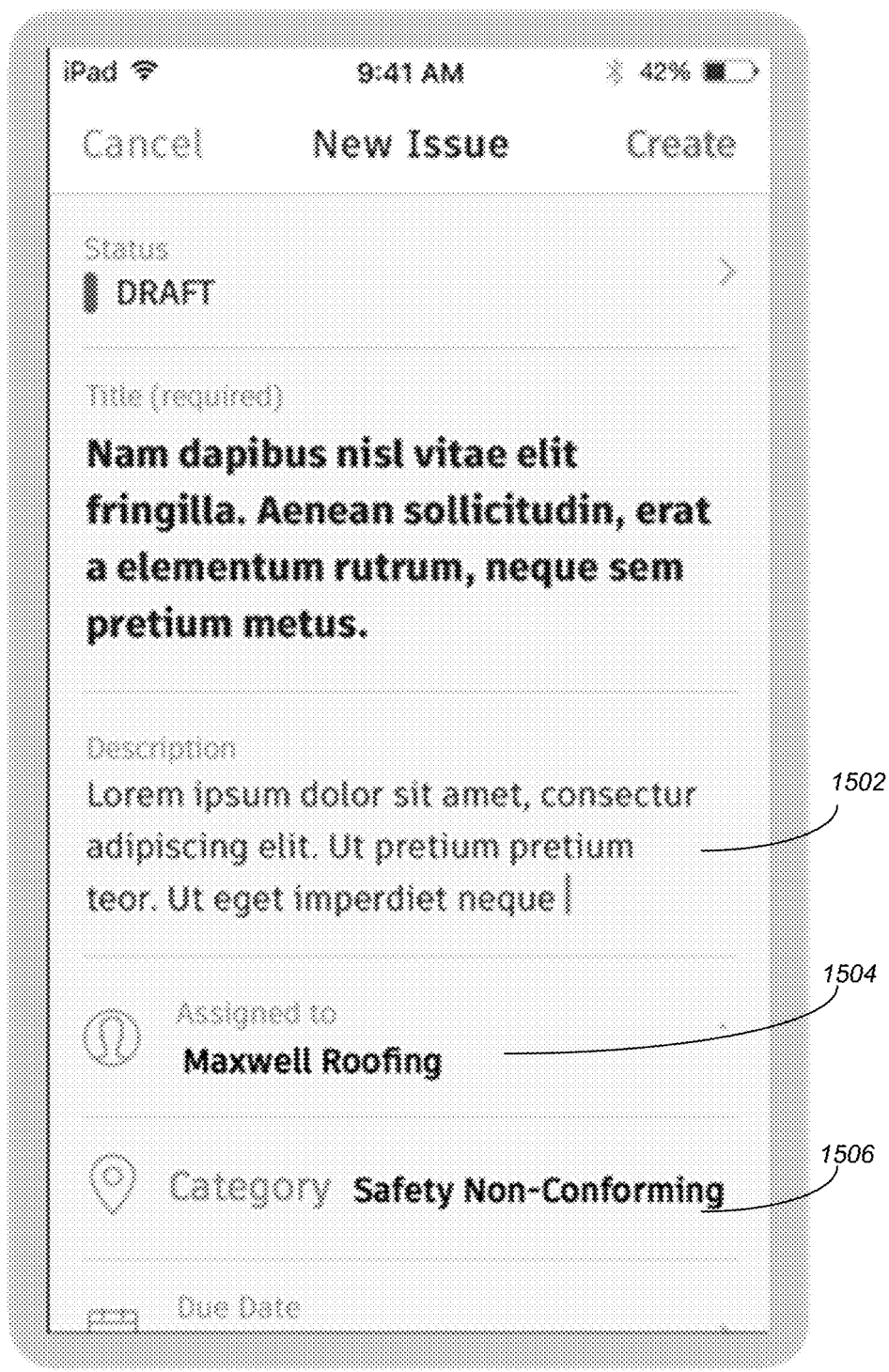
FIG. 15 illustrates a new issue user interface that includes the categorization in accordance with one or more embodiments of the invention.

Thereafter, categorizations of risk are generated from image-based categorization and/or the text provided by the user (if they reject the existing suggestions). FIG. 15 illustrates a new issue user interface that includes the categorization in accordance with one or more embodiments of the invention. The title of the issue and the description from FIG. 13 is displayed in area 1502. The assignee that the issue has been assigned to (from FIG. 14) is displayed in area 1504, and the category is listed in area 1506. Users can accept choices or reject the choices by inserting their own categories (or select from a menu of pre-specified categories).

Method and Apparatus for Presentation of Safety Behavior Risks and Safety Hazards In view of the above, embodiments of the invention evaluate and determine safety risks/hazards. To utilize the results of such an evaluation/determination, the risks/hazards are presented to the user. An exemplary user interface (e.g., that has been instantiated within a software architecture of embodiments) may be used to display different data relating to safety as well as the representations of the risk assessments in a way that is palatable and relatable to different levels of personas.

An interface in accordance with embodiments of the invention may provide insight into one or more of the following:

1. Rank ordering of subcontractors on the basis of safety flags;
2. Aggregations and accumulations with regards to positive observations;
3. Aggregations and cross-tabulations of accumulations between different hazard categories and safety risk categories based on negative/need-improvement types of observations; and/or
4. A time-horizon way to represent the weekly/monthly/yearly accumulations of fatal four risk issues of the particular subcontractor.

A user is given the ability to alternate between different subcontractors, and the resulting data displayed in the interface relates to the particular subcontractor as selected. Algorithms may also differentiate on data quality aspects. For example, embodiments may provide insight regarding whether the result is because of a 'low activity/inactivity' (unknown) versus 'activity but no safety issues generated' (positive).

Figure 16:
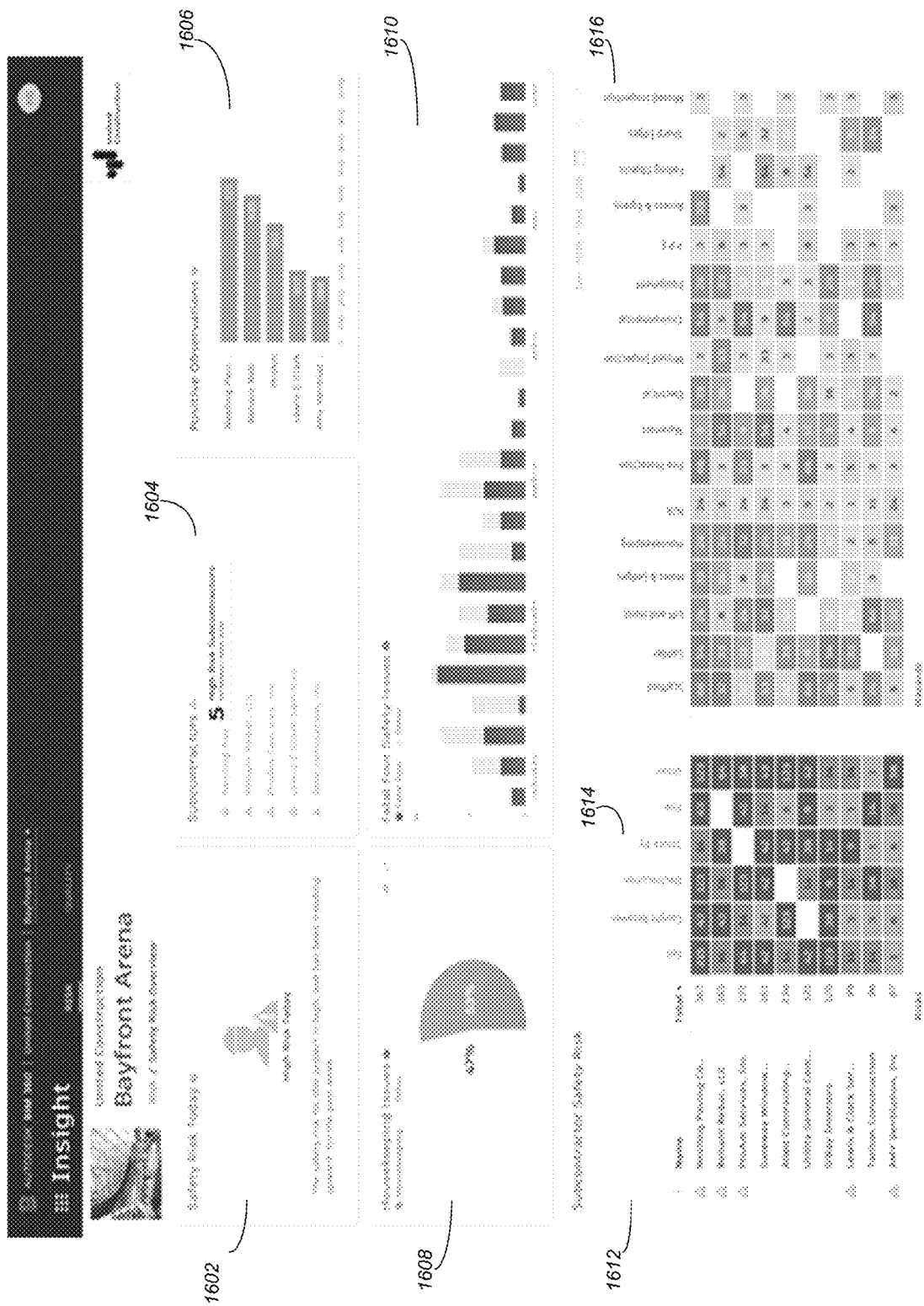
FIG. 16 illustrates an exemplary presentation of a safety risk metrics (also referred to as safety project levels) user interface in accordance with one or more embodiments of the invention.

FIG. 16 illustrates an exemplary presentation of a safety risk metrics (also referred to as safety project levels) user interface in accordance with one or more embodiments of the invention.

There are eight (8) distinct regions 1602-1616 that reflect the performance of different subcontractors on a particular project:

Region 1602 reflects the Project Level Safety Score.

Region 1604 reflects the subcontractors who are currently flagged with/as high safety behavioral scores/risks.

Region 1606 reflects the raw counts of positive observations (based on sentiment analysis on safety observations).

Region 1608 reflects the raw proportion of housekeeping-related safety issues.

Region 1610 reflects a time-bound summarization of weekly/daily/monthly safety behavior with regards to safety risks. These are the row counts of events that are also used in articulating subcontractor and project level safety behavioral scores.

Region 1612 reflects subcontractors relating to the work performed on the project. They can also be indexed by the duration of their presence on the project to normalize the counts of safety observations.

Region 1614 reflects the breakdown of Safety Risks observed on the particular project per subcontractor/business partner involved in the project. Note, if a subcontractor does not have any activity then a non-activity flag is provided.

Region 1616 reflects the level of hazards that each of the subcontractors have been involved/creator of. Larger number of safety observations may denote opportunities for training and can focus safety training.

Overall Logical Flow

Figure 17:
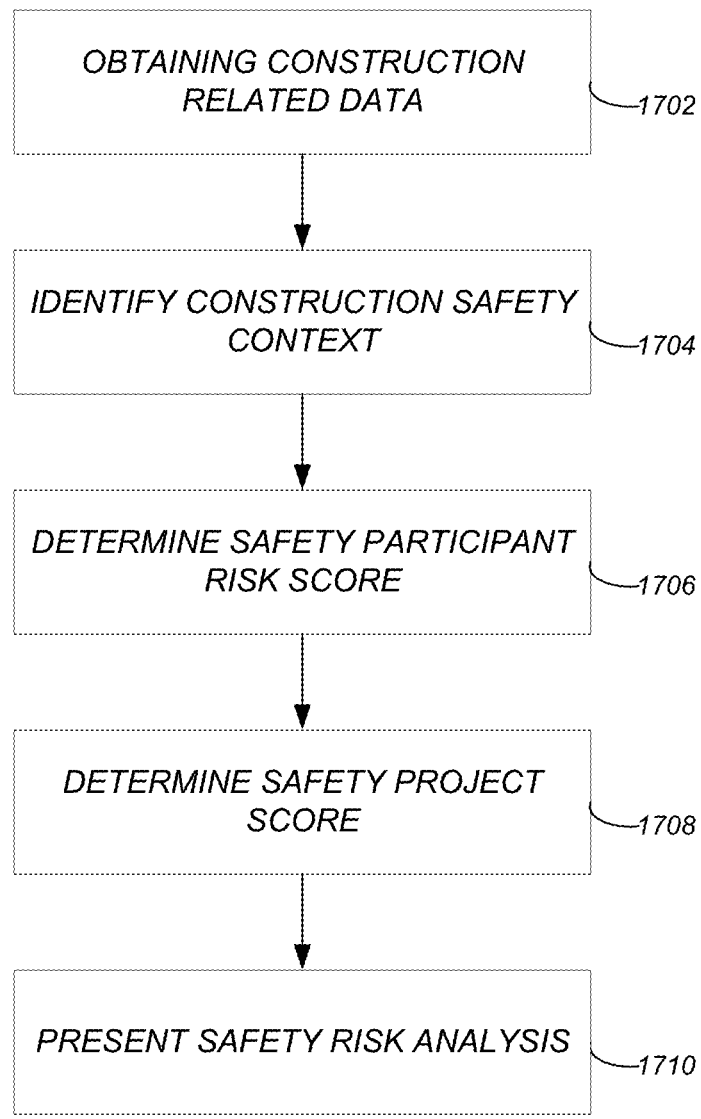
FIG. 17 illustrates the logical flow for determining and providing a safety risk analysis for construction in accordance with one or more embodiments of the invention.

FIG. 17 illustrates the logical flow for determining and providing a safety risk analysis for construction in accordance with one or more embodiments of the invention.

At step 1702, construction related data is obtained. The construction related data consists of textual data (e.g., a textual description based on user input) for a construction project and a visual artifact (e.g., a photograph of safety observations on a construction site) for the construction project. The construction related data may further consist of an incident tracking report, automatically generated issues that are automatically generated based on construction work on the construction site, and/or metadata (e.g., user generated categorizations). To obtain the construction related data, a photo of a construction issue may be captured and processed for ingestion. Thereafter, boxes and a classification label may be overlaid on the photo (and metadata may be used to capture information about the photo, overlaid boxes, and classification label). A rejection of the classification label may be received thereby allowing a user to edit the metadata/boxes/label, resulting in an update of a construction safety model based on machine learning. Eventually, an acceptance of the classification label is received, resulting in the storage of the metadata and an update of the construction safety model (based on machine learning).

At step 1704, a construction safety context is identified based on the construction related data. In one or more embodiments, the safety context is identified based on a determination that indicators in the textual data points to a potential safety risk associated with a fatal four risk category. Thereafter, the construction safety context may be identified as a high safety risk category. In additional embodiments, a set of rules and prediction models may be utilized to determine that the textual data is an indicator of context relating to a housekeeping issue (housekeeping issues are indicative of a safety hazard). Thereafter, a recency and frequency of housekeeping behavior may be tracked and provided to an end user.

In yet another embodiment, a set of rules and prediction models may be utilized to determine that the textual data is an indicator of context relating to a potential safety risk or hazard within one or more different safety classes. Thereafter, a safety issue may be labeled as a potential safety risk or hazard based on the determination.

In another embodiment, a set of rules and artificial intelligence prediction models are used to identify, in the visual artifact (e.g., in a photo), an object and an activity. The set of rules and artificial intelligence prediction models are also used to determine that the object and the activity are indicators of a context relating to a potential safety risk within one or more different safety classes (i.e., the context is extracted from the object and activity). Further, a safety issue is labeled as a potential safety hazard based on the indicators. Such a labeling may include corroborating the indicators with the textual data.

Further embodiments may extract textual features from the textual data and then model the textual features using machine learning classifiers. The modeling may then be utilized to determine whether a content and context of the textual data reflects a positive or negative sentiment (which affects the safety participant risk score).

At step 1706, based on the construction safety context, a safety participant risk score that assigns a numerical safety risk participant value to any entity involved in the construction project is determined. The safety participant risk score may be determined by utilizing a risk assessment model to generate a set of features (that consists of positive observations, hazard identification, and safety risk identification). The set of features may then be scored to determine the safety risk participant score which is then used to generate a safety warning flag.

At step 1708, based on the safety risk participant score, a safety project score that assigns a risk level on a per-project basis is determined. Such a determination may be based on a determination that a frequency, recency, and volume of activity is below a threshold value. Based on determination, the construction project may be flagged as low activity that overrides the safety participant risk score and the safety project score.

At step 1710, the safety risk analysis is presented via a graphical user interface. The safety risk analysis presented is based on the safety participant risk score and safety project score. In the presentation, the participants may then be ranked based on safety flags, positive observations may be aggregated, accumulations between different hazard categories and safety risk categories may be aggregated based on observations, and time period based accumulations of the fatal four risk issues of each entity in the construction project may be represented.

Further to the above, based on the construction related data, a trained neural network model may be utilized to generate neural word embeddings in the construction safety context. Based on the generated neural word embeddings, a similarity between different blobs of text in the construction safety context may be identified. Based on the similarity, hazard frequency and hazard recency may be determined. A safety risk model may then be constructed (e.g., based on the hazard frequency and recency). The safety risk model may then be utilized to determine the safety participant risk score and the safety project score.

Hardware Embodiments

Figure 18:
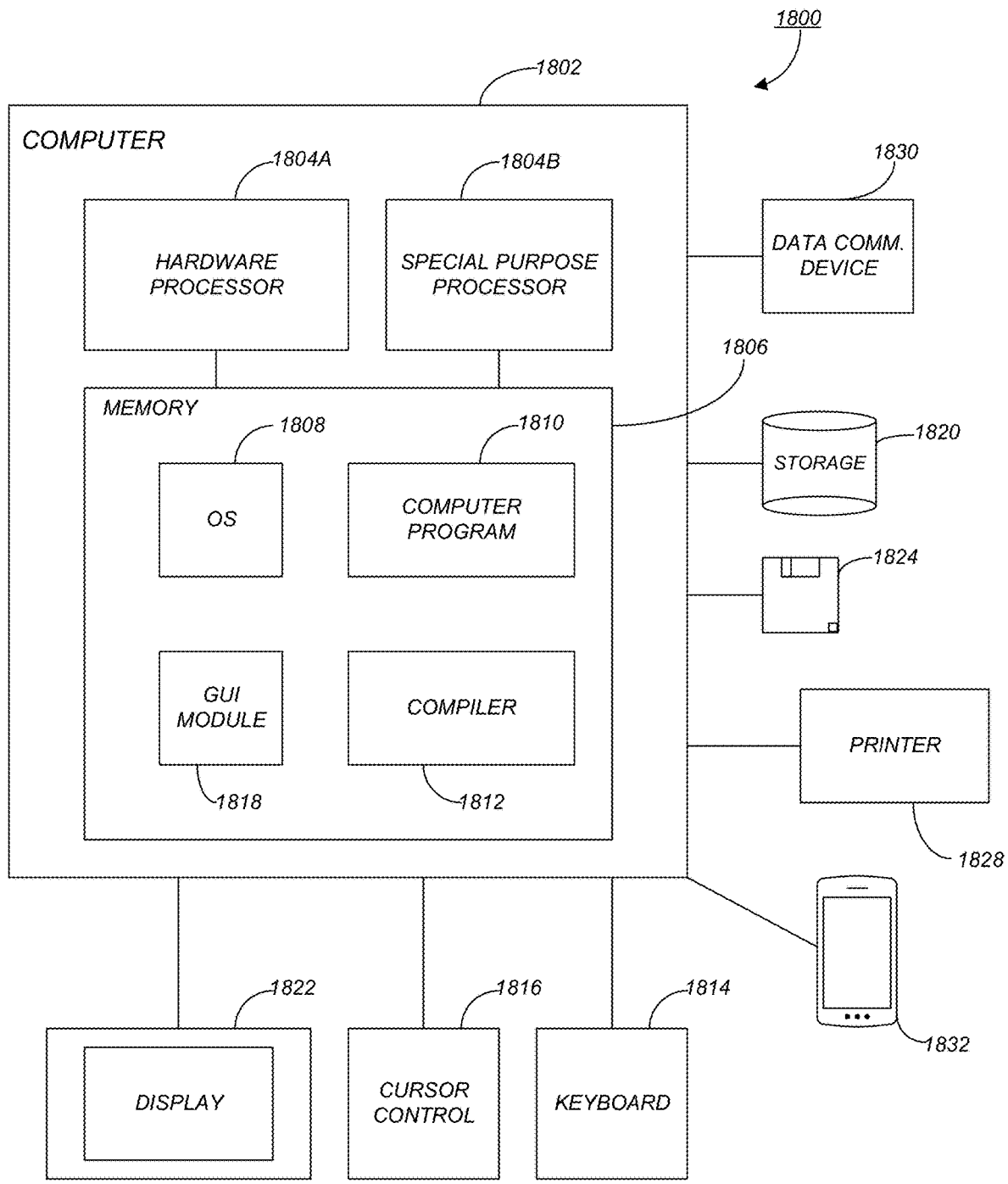
FIG. 18 is an exemplary hardware and software environment used to implement one or more embodiments of the invention.

FIG. 18 is an exemplary hardware and software environment 1800 used to implement one or more embodiments of the invention. The hardware and software environment includes a computer 1802 and may include peripherals. Computer 1802 may be a user/client computer, server computer, or may be a database computer. The computer 1802 comprises a general purpose hardware processor 1804A and/or a special purpose hardware processor 1804B (hereinafter alternatively collectively referred to as processor 1804) and a memory 1806, such as random access memory (RAM). The computer 1802 may be coupled to, and/or integrated with, other devices, including input/output (I/O) devices such as a keyboard 1814, a cursor control device 1816 (e.g., a mouse, a pointing device, pen and tablet, touch screen, multi-touch device, etc.) and a printer 1828. In one or more embodiments, computer 1802 may be coupled to, or may comprise, a portable or media viewing/listening device 1832 (e.g., an MP3 player, IPOD, NOOK, portable digital video player, cellular device, personal digital assistant, etc.).

In yet another embodiment, the computer 1802 may comprise a multi-touch device, mobile phone, gaming system, internet enabled television, television set top box, or other internet enabled device executing on various platforms and operating systems.

In one embodiment, the computer 1802 operates by the general purpose processor 1804A performing instructions defined by the computer program 1810 under control of an operating system 1808. The computer program 1810 and/or the operating system 1808 may be stored in the memory 1806 and may interface with the user and/or other devices to accept input and commands and, based on such input and commands and the instructions defined by the computer program 1810 and operating system 1808, to provide output and results.

Output/results may be presented on the display 1822 or provided to another device for presentation or further processing or action. In one embodiment, the display 1822 comprises a liquid crystal display (LCD) having a plurality of separately addressable liquid crystals. Alternatively, the display 1822 may comprise a light emitting diode (LED) display having clusters of red, green and blue diodes driven together to form full-color pixels. Each liquid crystal or pixel of the display 1822 changes to an opaque or translucent state to form a part of the image on the display in response to the data or information generated by the processor 1804 from the application of the instructions of the computer program 1810 and/or operating system 1808 to the input and commands. The image may be provided through a graphical user interface (GUI) module 1818. Although the GUI module 1818 is depicted as a separate module, the instructions performing the GUI functions can be resident or distributed in the operating system 1808, the computer program 1810, or implemented with special purpose memory and processors.

In one or more embodiments, the display 1822 is integrated with/into the computer 1802 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 1802 according to the computer program 1810 instructions may be implemented in a special purpose processor 1804B. In this embodiment, the some or all of the computer program 1810 instructions may be implemented via firmware instructions stored in a read only memory (ROM), a programmable read only memory (PROM) or flash memory within the special purpose processor 1804B or in memory 1806. The special purpose processor 1804B may also be hardwired through circuit design to perform some or all of the operations to implement the present invention. Further, the special purpose processor 1804B may be a hybrid processor, which includes dedicated circuitry for performing a subset of functions, and other circuits for performing more general functions such as responding to computer program 1810 instructions. In one embodiment, the special purpose processor 1804B is an application specific integrated circuit (ASIC).

The computer 1802 may also implement a compiler 1812 that allows an application or computer program 1810 written in a programming language such as C, C++, Assembly, SQL, PYTHON, PROLOG, MATLAB, RUBY, RAILS, HASKELL, or other language to be translated into processor 1804 readable code. Alternatively, the compiler 1812 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1810 accesses and manipulates data accepted from I/O devices and stored in the memory 1806 of the computer 1802 using the relationships and logic that were generated using the compiler 1812.

The computer 1802 also optionally comprises an external communication device such as a modem, satellite link, Ethernet card, or other device for accepting input from, and providing output to, other computers 1802.

In one embodiment, instructions implementing the operating system 1808, the computer program 1810, and the compiler 1812 are tangibly embodied in a non-transitory computer-readable medium, e.g., data storage device 1820, which could include one or more fixed or removable data storage devices, such as a zip drive, floppy disc drive 1824, hard drive, CD-ROM drive, tape drive, etc. Further, the operating system 1808 and the computer program 1810 are comprised of computer program 1810 instructions which, when accessed, read and executed by the computer 1802, cause the computer 1802 to perform the steps necessary to implement and/or use the present invention or to load the program of instructions into a memory 1806, thus creating a special purpose data structure causing the computer 1802 to operate as a specially programmed computer executing the method steps described herein. Computer program 1810 and/or operating instructions may also be tangibly embodied in memory 1806 and/or data communications devices 1830, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1802.

Figure 19:
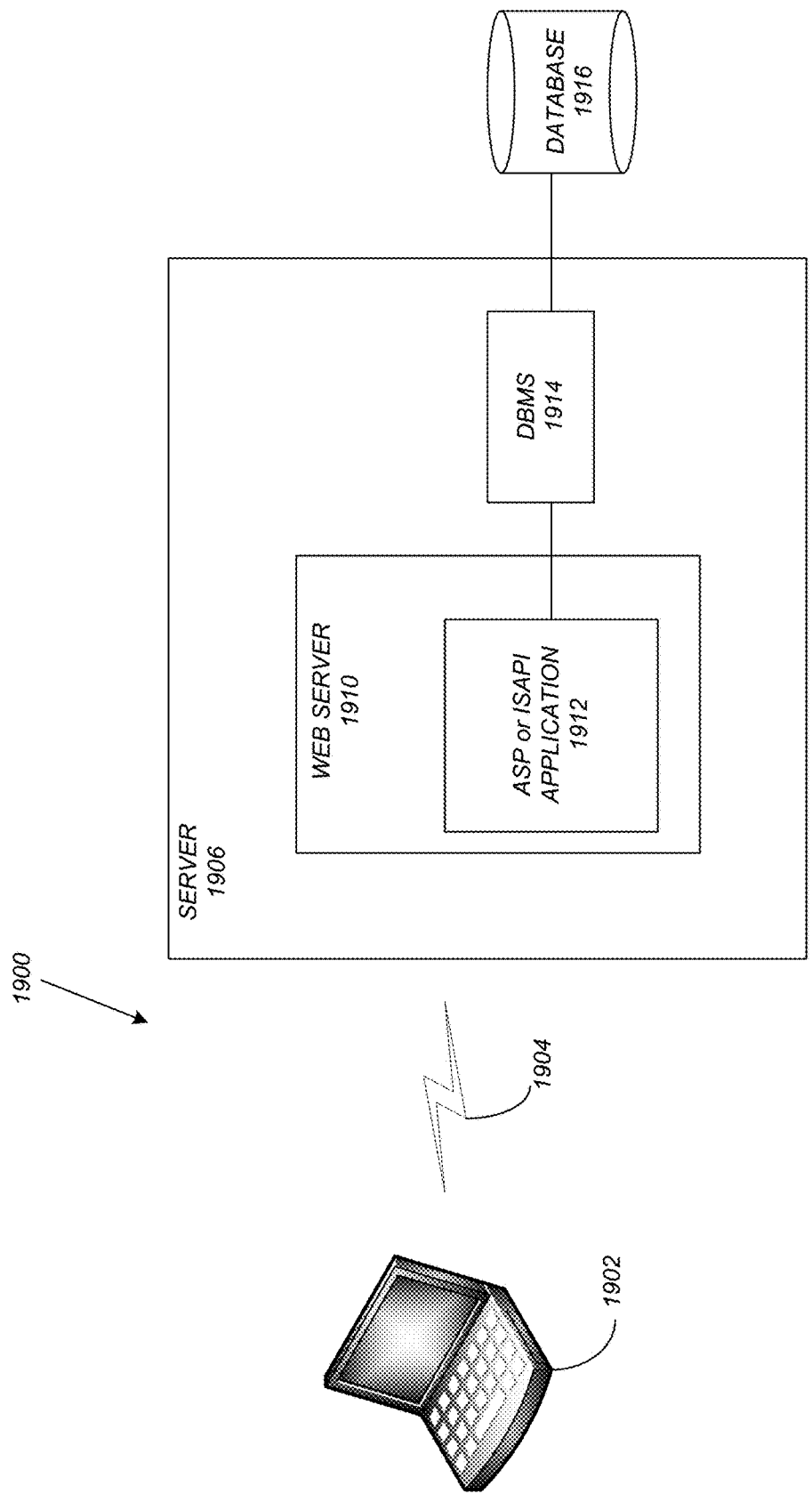
FIG. 19 schematically illustrates a typical distributed/cloud-based computer system using a network to connect client computers to server computers in accordance with one or more embodiments of the invention.

FIG. 19 schematically illustrates a typical distributed/cloud-based computer system 1900 using a network 1904 to connect client computers 1902 to server computers 1906. A typical combination of resources may include a network 1904 comprising the Internet, LANs (local area networks), WANs (wide area networks), SNA (systems network architecture) networks, or the like, clients 1902 that are personal computers or workstations (as set forth in FIG. 18), and servers 1906 that are personal computers, workstations, minicomputers, or mainframes (as set forth in FIG. 18). However, it may be noted that different networks such as a cellular network (e.g., GSM [global system for mobile communications] or otherwise), a satellite based network, or any other type of network may be used to connect clients 1902 and servers 1906 in accordance with embodiments of the invention.

A network 1904 such as the Internet connects clients 1902 to server computers 1906. Network 1904 may utilize ethernet, coaxial cable, wireless communications, radio frequency (RF), etc. to connect and provide the communication between clients 1902 and servers 1906. Further, in a cloud-based computing system, resources (e.g., storage, processors, applications, memory, infrastructure, etc.) in clients 1902 and server computers 1906 may be shared by clients 1902, server computers 1906, and users across one or more networks. Resources may be shared by multiple users and can be dynamically reallocated per demand. In this regard, cloud computing may be referred to as a model for enabling access to a shared pool of configurable computing resources.

Clients 1902 may execute a client application or web browser and communicate with server computers 1906 executing web servers 1910. Such a web browser is typically a program such as MICROSOFT INTERNET EXPLORER, MOZILLA FIREFOX, OPERA, APPLE SAFARI, GOOGLE CHROME, etc. Further, the software executing on clients 1902 may be downloaded from server computer 1906 to client computers 1902 and installed as a plug-in or ACTIVEX control of a web browser. Accordingly, clients 1902 may utilize ACTIVEX components/component object model (COM) or distributed COM (DCOM) components to provide a user interface on a display of client 1902. The web server 1910 is typically a program such as MICROSOFT'S INTERNET INFORMATION SERVER.

Web server 1910 may host an Active Server Page (ASP) or Internet Server Application Programming Interface (ISAPI) application 1912, which may be executing scripts. The scripts invoke objects that execute business logic (referred to as business objects). The business objects then manipulate data in database 1916 through a database management system (DBMS) 1914. Alternatively, database 1916 may be part of, or connected directly to, client 1902 instead of communicating/obtaining the information from database 1916 across network 1904. When a developer encapsulates the business functionality into objects, the system may be referred to as a component object model (COM) system. Accordingly, the scripts executing on web server 1910 (and/or application 1912) invoke COM objects that implement the business logic. Further, server 1906 may utilize MICROSOFT'S TRANSACTION SERVER (MTS) to access required data stored in database 1916 via an interface such as ADO (Active Data Objects), OLE DB (Object Linking and Embedding DataBase), or ODBC (Open DataBase Connectivity).

Generally, these components 1900-1916 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1902 and 1906 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1902 and 1906. Thus, embodiments of the invention may be implemented as a software application on a client 1902 or server computer 1906. Further, as described above, the client 1902 or server computer 1906 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for determining and providing a safety risk analysis for construction, comprising:
   obtaining construction related data, wherein the construction related data comprises textual data for a construction project and a visual artifact for the construction project;
   identifying a construction safety context based on the construction related data, wherein the construction safety context comprises a classification of a safety issue;
   based on the construction related data, utilizing a trained neural network model to generate neural word embeddings in the construction safety context;
   based on the generated neural word embeddings, identifying a similarity between different blobs of text in the construction safety context;
   based on the similarity, measuring hazard frequency and hazard recency;
   constructing a safety risk model based on the hazard frequency and recency;
   based on the construction safety context and utilizing the safety risk model, determining a safety participant risk score that assigns a numerical safety risk participant value to any entity involved in the construction project;
   based on the safety risk participant score and utilizing the safety risk model, determining a safety project score that assigns a risk level on a per-project basis; and
   presenting the safety risk analysis, based on the safety participant risk score and safety project score, via a graphical user interface.

2. The computer-implemented method of claim 1, wherein the construction related data comprises:
   the textual data comprising a textual description based on user input;
   the visual artifact comprising a photograph of safety observations on a construction site;
   an incident tracking report;
   automatically generated issues that are automatically generated based on construction work on the construction site; and
   metadata comprising user generated categorizations.

3. The computer-implemented method of claim 1, wherein the identifying the construction safety context comprises:
   determining that indicators in the textual data points to a potential safety risk associated with a fatal four risk category; and
   identifying the construction safety context as a high safety risk category.

4. The computer-implemented method of claim 1, wherein the identifying the construction safety context comprises:
   utilizing a set of rules and prediction models to determine that the textual data is an indicator of context relating to a housekeeping issue, wherein housekeeping issues are indicative of a safety hazard; and
   tracking and providing a recency and frequency of housekeeping behavior to an end user.

5. The computer-implemented method of claim 1, wherein the identifying the construction safety context comprises:
   utilizing a set of rules and prediction models to determine that the textual data is an indicator of context relating to a potential safety risk or hazard within one or more different safety classes; and
   labeling a safety issue as a potential safety risk or hazard based on the determination.

6. The computer-implemented method of claim 1, wherein the identifying the construction safety context comprises:
   utilizing a set of rules and artificial intelligence prediction models to identify, in the visual artifact, an object and an activity;
   utilizing the set of rules and artificial intelligence prediction models to determine that the object and the activity are indicators of a context relating to a potential safety risk within one or more different safety classes; and
   labeling a safety issue as a potential safety hazard based on the indicators.

7. The computer-implemented method of claim 6, wherein the labeling the safety issue further comprises:
   corroborating the indicators with the textual data.

8. The computer-implemented method of claim 1, wherein the identifying the construction safety context comprises:
   extracting, from the textual data, textual features;
   modeling, using machine learning classifiers, the textual features; and
   utilizing the modeling to determine whether a content and context of the textual data reflects a positive or negative sentiment, wherein the positive or negative sentiment affects the safety participant risk score.

9. The computer-implemented method of claim 1, wherein the determining the safety participant risk score comprises:
   utilizing a risk assessment model to generate a set of features, wherein the set of features comprise positive observations, hazard identification, and safety risk identification;
   scoring the set of features to determine the safety participant risk score; and
   generating, based on the safety participant risk score, a safety warning flag.

10. The computer-implemented method of claim 1, wherein the determining the safety project score comprises:
    determining that a frequency, recency, and volume of activity is below a threshold value; and
    flagging the construction project as low activity that overrides the safety participant risk score and the safety project score.

11. The computer-implemented method of claim 1, wherein the presenting the safety risk analysis comprises:
    rank ordering participants based on safety flags;
    aggregating positive observations;
    aggregating accumulations between different hazard categories and safety risk categories based on observations; and
    representing time period based accumulations of fatal four risk issues of each entity involved in the construction project.

12. The computer-implemented method of claim 1, wherein the obtaining construction related data comprises:
    capturing a photo of a construction issue;
    processing the photo for ingestion;
    overlaying boxes and a classification label on the photo, wherein metadata comprises the photo, overlaid boxes, and classification label;
    receiving a rejection of the classification label;
    based on the rejection, editing the metadata and updating a construction safety model based on machine learning;
    receiving an acceptance of the classification label;
    the metadata and updating the construction safety model based on machine learning.

13. A computer-implemented system for determining and providing a safety risk analysis for construction, comprising:
    (a) a computer having a memory;
    (b) a processor executing on the computer;
    (c) the memory storing an application that is executed by the processor, causing the application to:
       (i) obtain construction related data, wherein the construction related data comprises textual data for a construction project and a visual artifact for the construction project;
       (ii) identify a construction safety context based on the construction related data, wherein the construction safety context comprises a classification of a safety issue;
       (iii) based on the construction related data, utilize a trained neural network model to generate neural word embeddings in the construction safety context;
       (iv) based on the generated neural word embeddings, identify a similarity between different blobs of text in the construction safety context;
       (v) based on the similarity, measure hazard frequency and hazard recency;
       (vi) construct a safety risk model based on the hazard frequency and recency;
       (vii) based on the construction safety context and utilizing the safety risk model, determine a safety participant risk score that assigns a numerical safety risk participant value to any entity involved in the construction project;
       (viii) based on the safety risk participant score and utilizing the safety risk model, determine a safety project score that assigns a risk level on a per-project basis; and
       (ix) present the safety risk analysis, based on the safety participant risk score and safety project score, via a graphical user interface.

14. The computer-implemented system of claim 13, wherein the construction related data comprises:
    the textual data comprising a textual description based on user input;

the visual artifact comprising a photograph of safety observations on a construction site;
an incident tracking report;
automatically generated issues that are automatically generated based on construction work on the construction site; and
metadata comprising user generated categorizations.

15. The computer-implemented system of claim 13, wherein the application identifies the construction safety context by:
determining that indicators in the textual data points to a potential safety risk associated with a fatal four risk category; and
identifying the construction safety context as a high safety risk category.

16. The computer-implemented system of claim 13, wherein the application identifies the construction safety context by:
utilizing a set of rules and prediction models to determine that the textual data is an indicator of context relating to a housekeeping issue, wherein housekeeping issues are indicative of a safety hazard; and
tracking and providing a recency and frequency of housekeeping behavior to an end user.

17. The computer-implemented system of claim 13, wherein the application identifies the construction safety context by:
utilizing a set of rules and prediction models to determine that the textual data is an indicator of context relating to a potential safety risk or hazard within one or more different safety classes; and
labeling a safety issue as a potential safety risk or hazard based on the determination.

18. The computer-implemented system of claim 13, wherein the application identifies the construction safety context by:
utilizing a set of rules and artificial intelligence prediction models to identify, in the visual artifact, an object and an activity;
utilizing the set of rules and artificial intelligence prediction models to determine that the object and the activity are indicators of a context relating to a potential safety risk within one or more different safety classes; and
labeling a safety issue as a potential safety hazard based on the indicators.

19. The computer-implemented system of claim 18, wherein the application labels the safety issue by:
corroborating the indicators with the textual data.

20. The computer-implemented system of claim 13, wherein the application identifies the construction safety context by:
extracting, from the textual data, textual features;
modeling, using machine learning classifiers, the textual features; and
utilizing the modeling to determine whether a content and context of the textual data reflects a positive or negative sentiment, wherein the positive or negative sentiment affects the safety participant risk score.

21. The computer-implemented system of claim 13, wherein the application determines the safety participant risk score by:
utilizing a risk assessment model to generate a set of features, wherein the set of features comprise positive observations, hazard identification, and safety risk identification;
scoring the set of features to determine the safety participant risk score; and
generating, based on the safety participant risk score, a safety warning flag.

22. The computer-implemented system of claim 13, wherein the application determines the safety project score by:
determining that a frequency, recency, and volume of activity is below a threshold value; and
flagging the construction project as low activity that overrides the safety participant risk score and the safety project score.

23. The computer-implemented system of claim 13, wherein the application presents the safety risk analysis by:
rank ordering participants based on safety flags;
aggregating positive observations;
aggregating accumulations between different hazard categories and safety risk categories based on observations; and
representing time period based accumulations of fatal four risk issues of each entity involved in the construction project.

24. The computer-implemented system of claim 13, wherein the application obtains construction related data by:
capturing a photo of a construction issue;
processing the photo for ingestion;
overlaying boxes and a classification label on the photo, wherein metadata comprises the photo, overlaid boxes, and classification label;
receiving a rejection of the classification label;
based on the rejection, editing the metadata and updating a construction safety model based on machine learning;
receiving an acceptance of the classification label;
the metadata and updating the construction safety model based on machine learning.

25. A computer-implemented method for determining and providing a safety risk analysis for construction, comprising:
obtaining construction related data, wherein the construction related data comprises textual data for a construction project and a visual artifact for the construction project;
identifying a construction safety context based on the construction related data, wherein the construction safety context comprises a classification of a safety issue;
based on the construction safety context, determining a safety participant risk score that assigns a numerical safety risk participant value to any entity involved in the construction project;
based on the safety risk participant score, determining a safety project score that assigns a risk level on a per-project basis, wherein the determining the safety project score comprises:
determining that a frequency, recency, and volume of activity is below a threshold value; and
flagging the construction project as low activity that overrides the safety participant risk score and the safety project score; and
presenting the safety risk analysis, based on the safety participant risk score and safety project score, via a graphical user interface.

26. A computer-implemented system for determining and providing a safety risk analysis for construction, comprising:
- (a) a computer having a memory;
- (b) a processor executing on the computer;
- (c) the memory storing an application that is executed by the processor, causing the application to:
  - (i) obtain construction related data, wherein the construction related data comprises textual data for a construction project and a visual artifact for the construction project;
  - (ii) identify a construction safety context based on the construction related data, wherein the construction safety context comprises a classification of a safety issue;
  - (iii) based on the construction safety context, determine a safety participant risk score that assigns a numerical safety risk participant value to any entity involved in the construction project;
  - (iv) based on the safety risk participant score, determine a safety project score that assigns a risk level on a per-project basis, wherein the safety project score is determined by:
    - (1) determining that a frequency, recency, and volume of activity is below a threshold value; and
    - (2) flagging the construction project as low activity that overrides the safety participant risk score and the safety project score; and
  - (v) present the safety risk analysis, based on the safety participant risk score and safety project score, via a graphical user interface.

* * * * *